US006816634B2

(12) United States Patent
Hirawa

(10) Patent No.: US 6,816,634 B2
(45) Date of Patent: Nov. 9, 2004

(54) IMAGE RECORDER

(75) Inventor: Takahide Hirawa, Kyoto (JP)

(73) Assignee: Dainippon Screen Mfg. Co., Ltd., Kyoto (JP)

(*) Notice: Subject to any disclaimer, the term of this patent is extended or adjusted under 35 U.S.C. 154(b) by 586 days.

(21) Appl. No.: 09/987,562

(22) Filed: Nov. 15, 2001

(65) Prior Publication Data
US 2002/0064317 A1 May 30, 2002

(30) Foreign Application Priority Data

Nov. 30, 2000 (JP) ........................................ 2000-365354

(51) Int. Cl.$^7$ ................................................ G06K 9/54
(52) U.S. Cl. .................. 382/305; 382/274; 382/275; 382/299; 358/3.26; 358/3.27; 358/463
(58) Field of Search ................................ 382/252, 274, 382/275, 282, 299, 309; 358/1.2, 3.26, 3.27, 505, 463

(56) References Cited

U.S. PATENT DOCUMENTS

| | | | |
|---|---|---|---|
| 4,303,936 A | | 12/1981 | Shaw |
| 5,410,417 A | * | 4/1995 | Kuznicki et al. ...... 358/426.02 |
| 5,453,851 A | * | 9/1995 | Faulhaber ................... 358/481 |
| 5,668,588 A | | 9/1997 | Morizumi et al. |
| 5,872,587 A | | 2/1999 | Fujita et al. |
| 5,949,922 A | * | 9/1999 | Wada et al. ................ 382/295 |
| 6,147,709 A | * | 11/2000 | Martin et al. ............... 348/239 |
| 6,249,306 B1 | | 6/2001 | Isono et al. |
| 6,325,288 B1 | * | 12/2001 | Spitz ..................... 235/462.12 |

FOREIGN PATENT DOCUMENTS

| | | |
|---|---|---|
| EP | 0 918 255 A | 5/1999 |
| JP | 9-23320 | 1/1997 |
| JP | 2000-43317 A | 2/2000 |
| JP | 2000-43318 A | 2/2000 |
| JP | 2000-131628 A | 5/2000 |

* cited by examiner

Primary Examiner—Bhavesh M. Mehta
Assistant Examiner—Yosef Kassa
(74) Attorney, Agent, or Firm—McDermott Will & Emery LLP

(57) ABSTRACT

An image recorder performs a first distortion correction at the resolution of an input image and a second distortion correction at the resolution of a recording head. The first distortion correction is performed by setting an angle difference between a write angle and a read angle to and from address space in a buffer memory (BM) to be equal to an inclination angle of scanning lines with respect to a main scanning direction. The second distortion correction is performed by shifting image data obtained by the first distortion correction in a sub-scanning direction by an amount responsive to the inclination angle. The smallest unit of the amount is one pixel unit (P). More specifically, image data is shifted by the width of one pixel (D) in blocks for memory access, and then for output of a gradient value for each pixel (D), it is further shifted by the width of one pixel unit (P) in sub-blocks which are obtained by dividing each block.

14 Claims, 22 Drawing Sheets

BM1 BM2 BM3

$\theta_w = \theta_c$  $\theta_w$

BM1 BM2 BM3

BM1 BM2 BM3

*FIG.9A*    *FIG.9B*    *FIG.9C*
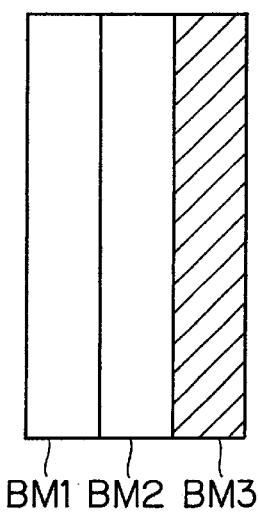
$\theta_r = 0$
BM1 BM2 BM3
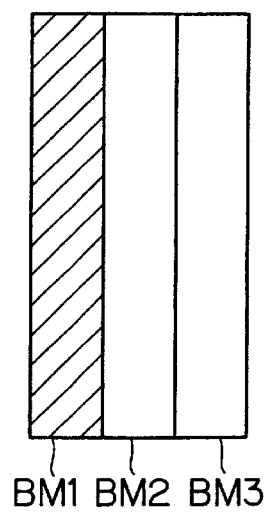
BM1 BM2 BM3
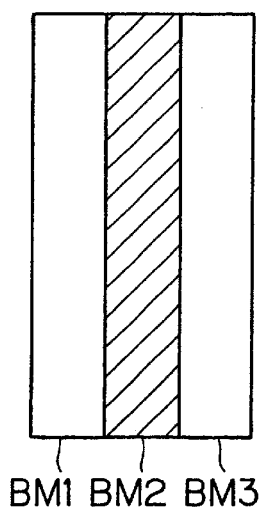
BM1 BM2 BM3

| | BM1 | BM2 | BM3 |
|---|---|---|---|
| Preprocessing 1 | All Clear | All Clear | All Clear |
| Preprocessing 2 | Write1 | Write1 | No Operation |
| Output No.1 | Read Memory1 | Write2 | Write2 |
| Output No.2 | Write3 | Read Memory2 | Write3 |
| Output No.3 | Write1 | Write1 | Read Memory3 |
| Output No.4 | Read Memory1 | Write2 | Write2 |
| Output No.5 | Write3 | Read Memory2 | Write3 |
| Output No.(m−1) | Write1 (Clear) | No Operation | Read Memory3 |
| Output No.m | Read Memory1 | No Operation | No Operation |

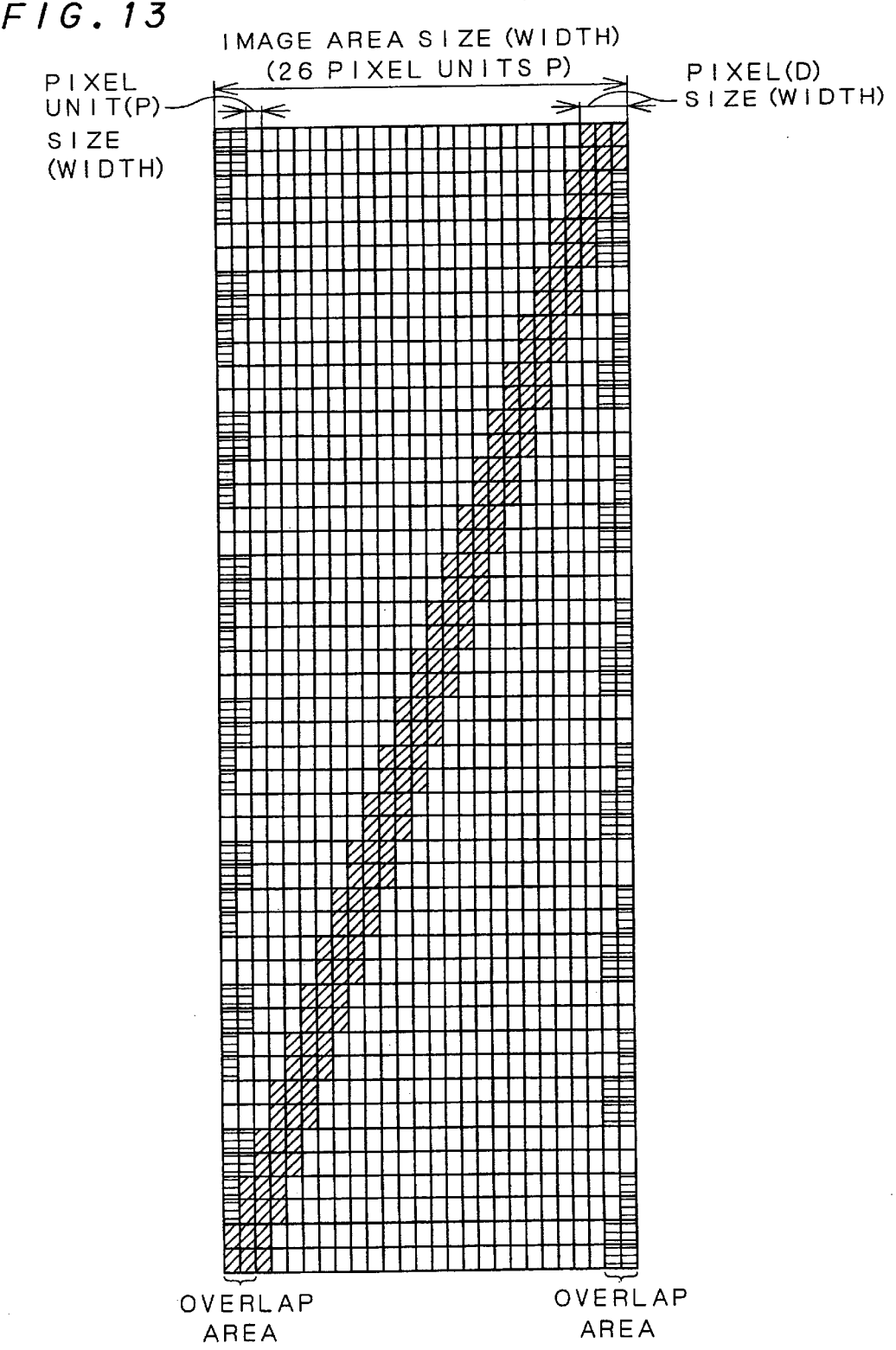

IMAGE RECORDER

BACKGROUND OF THE INVENTION

1. Field of the Invention

The present invention relates to an image recorder and image recording method for correcting image distortion in continuous scanning systems such as spiral scanning systems to achieve high image quality.

2. Description of the Background Art

Some image recorders have employed continuous scanning systems such as spiral scanning systems to improve their recording speed. The spiral scanning systems are for performing a scan while continuously moving an image recording beam in a sub-scanning direction orthogonal to a main scanning direction relative to an image recording medium that is mounted on a recording drum (rotating drum) rotating in the main scanning direction, thereby to record an image along scanning lines inclined with respect to the main scanning direction.

In the spiral scanning systems, as shown in FIG. 19, the scanning lines are inclined at an angle θc with respect to the main scanning direction X. A resultant image on the film has the shape of a parallelogram and is distorted.

The following is one of the techniques for correcting such image distortion.

This technique is for correcting image distortion by setting an angle difference between a write angle and a read angle to be equal to the angle of inclination of the scanning lines with respect to the main scanning direction. Here, the write angle is the angle at which image data is written into address space in a memory (buffer memory) for image data, and the read angle is the angle at which the image data is read out from the address space in the memory.

As shown in FIG. 20, this technique corrects image distortion by dividing an image into a plurality of blocks along the main scanning direction X and producing a shift in the sub-scanning direction Y in blocks for memory access to achieve the above angle difference.

Each of the blocks has Nc pixels (Nc=Nb/Na) arranged in the main scanning direction X, the value Nc being obtained by dividing the number of pixels Nb arranged in the main scanning direction X in a recording drum by the number of pixels Na that a recording head can record at a time in the sub-scanning direction Y (i.e., the width of one scanning line in the sub-scanning direction Y). Expressed differently, the surface area of the recording drum is divided into Na blocks along the main scanning direction X.

The blocks are then shifted in the sub-scanning direction Y by amounts determined for each block to achieve the above angle difference and in this condition, memory accesses are made to correct image distortion.

In this case, the "shift" in the sub-scanning direction Y occurs at a discontinuous point between each block, and the number of "shifts" to take place increases with increasing number of the blocks Na arranged in the main scanning direction X. Here, the amount of the "shift" in the sub-scanning direction Y is one pixel in an image.

In the above conventional technique, if the number of pixels (frankly, the number of output channels) Na is small, the number of blocks is also small. Accordingly, the number of "shifts" occurring in the main scanning direction X is small and relatively unobstructive.

However, as the number of pixels (output channels) Na increases, the number of blocks also increases, which increases the number of "shifts" to take place each having a width of one pixel in the image. In such a case, the "shifts" become perceptible to the human eye, causing a problem of image degradation.

Especially, with speedups in image recording, the number of output channels is increasing in recent years; for example, some image recorders have several hundreds of output channels. The fact is that the aforementioned problem becomes more evident.

In the above conventional technique, image distortion correction may be performed by improving a resolution (i.e., reducing the size of each pixel) in the sub-scanning direction Y to reduce the amount of "shift". This, however, brings another problem of increasing the required memory capacity. Besides, such an increase in memory capacity requires a higher processing speed of hardware and makes an increase in cost unavoidable.

SUMMARY OF THE INVENTION

A first aspect of the present invention is directed to an image recorder for recording an input image on an image recording medium along scanning lines inclined with respect to a main scanning direction, by using a continuous scanning system for performing a continuous scan in both the main scanning direction and a sub-scanning direction. The image recorder comprises: a recording head for outputting each pixel in the input image as a set of pixel units smaller than the pixel, the recording head having a higher resolution than the input image in the sub-scanning direction; a scanning section for performing a scan by continuously moving the recording head relative to the image recording medium in both the main scanning direction and the sub-scanning direction; a memory for storing image data of the input image; an access controller for, for access to the memory, setting an angle difference between a write angle and a read angle to be equal to an inclination angle of the scanning lines with respect to the main scanning direction, the write angle being an angle at which the image data is written into an address space in the memory, the read angle being an angle at which the image data is read out from the address space in the memory; and a shift controller for outputting image data read out from the address space in a position that is shifted in the sub-scanning direction by a shift amount responsive to the inclination angle, the smallest unit of the shift amount being the pixel unit.

The first aspect of the present invention can achieve more smooth, high-quality image distortion since image data read out from the address space in the memory is outputted in a position that is shifted in the sub-scanning direction by a shift amount responsive to the inclination angle, the smallest unit of which is the pixel unit. Further, the memory only needs to have the capacity responsive to the resolution of the input image, which minimizes an increase in the required memory capacity.

According to a second aspect of the present invention, in the image recorder, an image area of the recording head is greater in width than the scanning lines in the sub-scanning direction.

The second aspect of the present invention allows overlapping imaging and thereby can minimize detection of a gap between each scanning line.

According to a third aspect of the present invention, in the image recorder, the image area of the recording head has a width that is obtained by adding the width of the scanning lines and a width smaller than the width of one pixel in the input image.

The third aspect of the present invention allows overlapping imaging, thereby minimizing detection of a gap between each scanning line and reducing the required memory capacity with a minimum amount of overlap.

According to a fourth aspect of the present invention, in the image recorder, the memory substantially has a storage area corresponding to three main scans.

The fourth aspect of the present invention can thus reduce the required memory capacity.

According to a fifth aspect of the present invention, in the image recorder, an image area of the recording head has the same width as the scanning lines in the sub-scanning direction.

The fifth aspect of the present invention can thus perform imaging for each scanning line with a maximum use of the width of the image area of the recording head.

According to a sixth aspect of the present invention, in the image recorder, the memory substantially has a storage area corresponding to four main scans.

According to a seventh aspect of the present invention, in the image recorder, the recording head uses a spatial light modulator for recording an image on the image recording medium.

The seventh aspect of the present invention can thus achieve a high-resolution recording head.

According to an eighth aspect of the present invention, in the image recorder, the spatial light modulator is a diffraction grating light valve.

The eighth aspect of the present invention can thus achieve an especially high-resolution recording head.

According to a ninth aspect of the present invention, in the image recorder, a resolution ratio between the input image and the recording head is variable.

The ninth aspect of the present invention can thus vary the width of recording per one main scan according to the required image quality and can also select a combination of the recording speed and image quality.

The present invention is also directed to an image recording method.

Therefore, an object of the present invention is to provide an image recorder and image recording method for correcting image distortion in continuous scanning systems such as spiral scanning systems with a minimum increase in memory capacity, thereby to achieve high image quality.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 9A, 9B, and 9C show read operations from the buffer memory BM and each illustrates a read area at a different point in time;

FIG. 13 is an explanatory diagram of a second correction operation;

FIG. 14A illustrates an array of pixels D read out from the buffer memory BM and FIG. 14B illustrates an array of pixel units P to be outputted after shift operations;

DESCRIPTION OF THE PREFERRED EMBODIMENTS

Hereinbelow, preferred embodiments of the present invention will be described in detail with reference to the drawings.

<A. First Preferred Embodiment>

<A1. Configuration>

<Outline>

Figure 1:
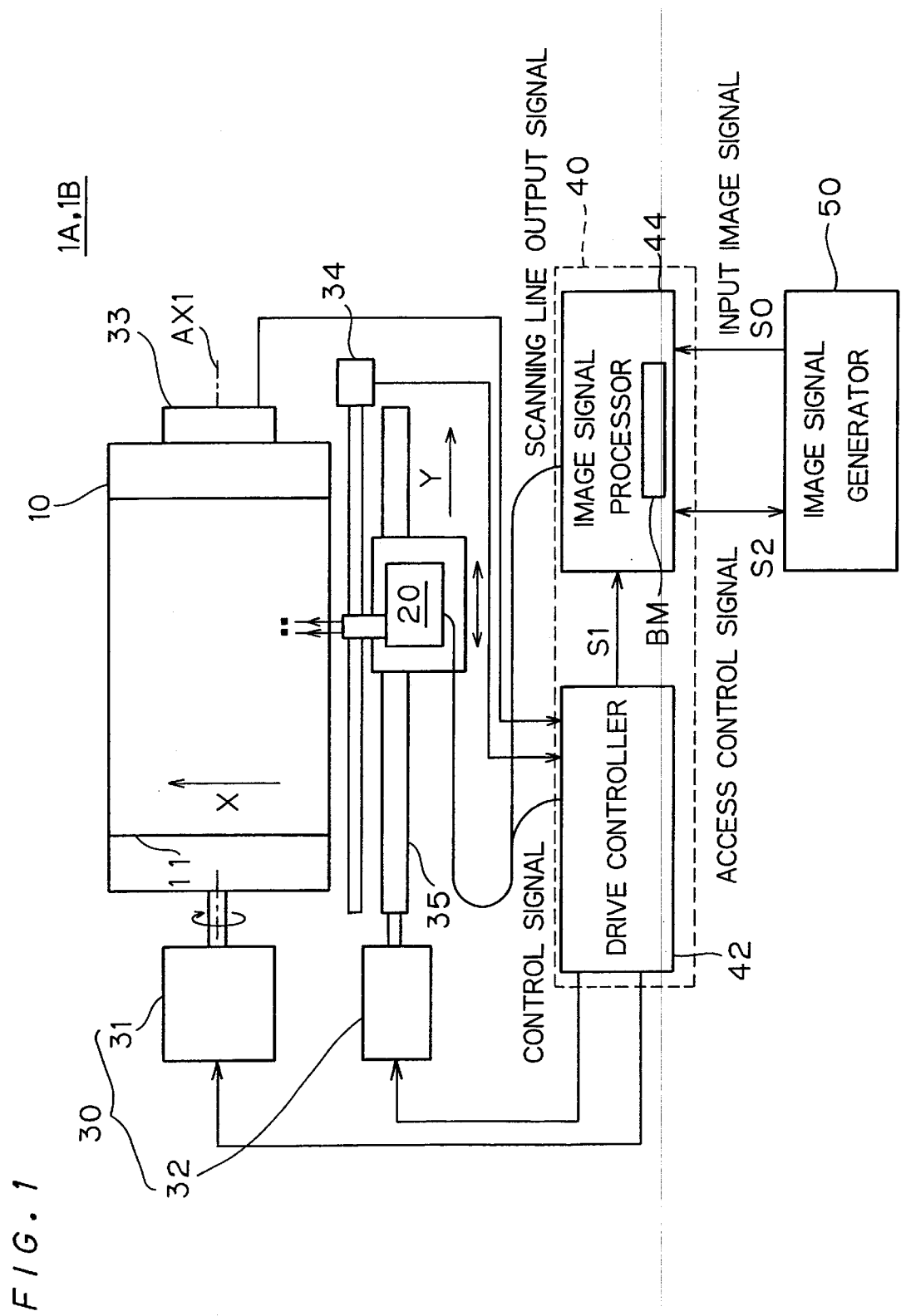
FIG. 1 is a schematic diagram showing a configuration of an image recorder 1A or 1B according to a first or second preferred embodiment of the present invention.

FIG. 1 is a schematic diagram showing a configuration of an image recorder 1A according to a first preferred embodiment of the present invention. As shown in FIG. 1, the image recorder 1A comprises a cylindrical recording drum 10, a recording head 20, a scanner 30, a controller 40, and an image signal generator 50. The image recorder 1A adopts a spiral scanning system, i.e., a system for performing a scan while continuously moving the recording head 20 in a sub-scanning direction Y orthogonal to a main scanning direction X relative to an imaging plate (image recording medium) 11 that is mounted on the recording drum (rotator) 10 rotating in the main scanning direction X, thereby to record an image along scanning lines inclined with respect to the main scanning direction X.

The imaging plate 11 on which an image is recorded (i.e., image recording medium) is wound on the surface of the cylindrical recording drum 10. The recording drum 10 has one end connected to a drum rotating motor 31 and it rotates at a fixed rotation speed about its central axis AX1 under the driving force of the drum rotating motor 31. Thereby, the recording drum 10 can perform a scan in the direction of rotation (main scanning direction) X. The recording drum 10 further has a rotary encoder 33 at its other end, which can detect the rotation angle and speed.

The recording head 20 is supported by a linear guide 35 with a ball screw and is movable in parallel with the central axis AX1 of the recording drum 10. More specifically, the linear guide 35 with a ball screw is located in parallel with the central axis AX1 of the recording drum 10. The ball screw of the linear guide 35 rotates under the driving force of a feed motor 32 located at one end of the linear guide 35 and this rotational motion turns into a driving force in the horizontal direction Y. The recording head 20 connected to the ball screw can thus move in the sub-scanning direction Y while being supported by a guide portion of the linear guide 35. In parallel with the linear guide 35, a linear encoder 34 is provided which can detect the position of the recording head 20 with respect to the sub-scanning direction Y.

The scanner 30 includes the drum rotating motor 31 and the feed motor 32 described above. With both the motors 31 and 32 controlled by the controller 40 to be described later, the recording head 20 can continuously and relatively move in both the main scanning direction X and the sub-scanning direction Y for scanning on the image recording medium 11 wound on the recording drum 10.

The image signal generator 50 generates an image signal corresponding to an image to be processed (hereinafter also referred to as an "input image"). More specifically, document data to be processed is subjected to, for example, raster image processing (RIP), whereby an image signal corresponding to an image to be processed is generated. The image signal generated in the image signal generator 50 is outputted in properly timed sequence to an image signal processor 44 as an input image signal S0 corresponding to an input image M.

The controller 40 includes a drive controller 42 and the image signal processor 44. The drive controller 42 receives detection signals from the rotary encoder 33 and the linear encoder 34 and can thereby determine the current position of the recording head 20, more specifically, the current position (x, y) of the recording head 20 with respect to the X and Y directions on the imaging plate 11, with accuracy. The drive controller 42 then outputs a timing control signal S1 responsive to the current position (x, y) of the recording head 20 to the image signal processor 44, and the image signal processor 44, on the basis of the timing control signal S1, processes the input image signal S0 from the image signal generator 50. On the basis of an access control signal S2, the image signal processor 44 also writes an image signal generated in the image signal generator 50 into the buffer memory BM and reads out data written in the buffer memory BM. The image signal processor 44 further gives to the recording head 20 a command to output image data that is to be actually imaged by the recording head 20 on the imaging plate 11. Image distortion correction is performed during this process, which will later be described in detail.

<Recording Head 20>

Figure 2:
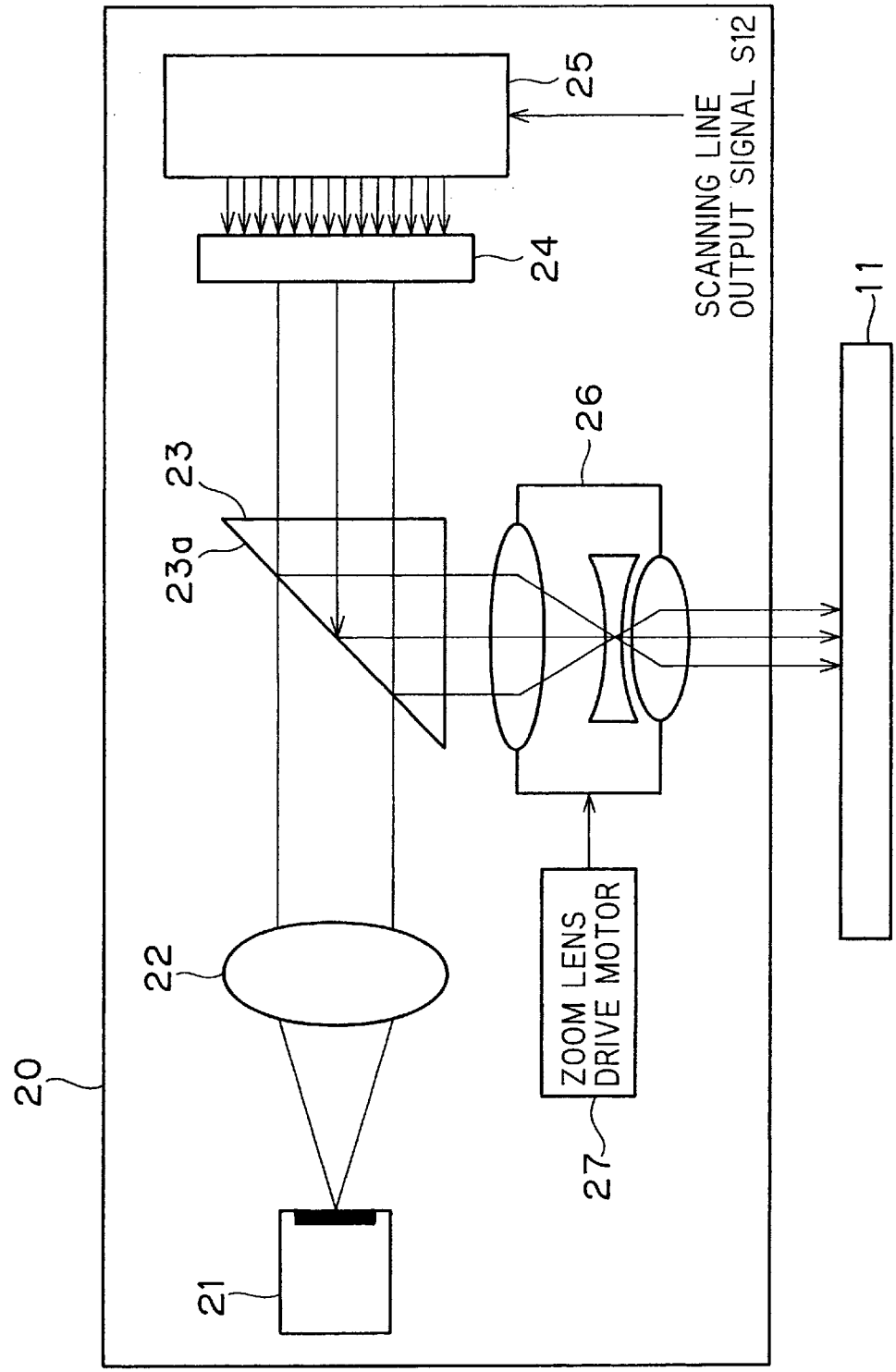
FIG. 2 is a diagram of a recording head 20.

Referring now to FIG. 2, a configuration of the recording head 20 will be set forth. The recording head 20 comprises a laser light source 21, an illumination lens 22, a prism 23, a spatial light modulator 24, a spatial light modulator drive circuit 25, an imaging zoom lens 26, and a zoom lens drive motor 27.

Light emitted from the laser light source 21 is collimated by the illumination lens 22 and passes through the prism 23 toward the spatial light modulator 24 for irradiation of the spatial light modulator 24. The light modulated by the spatial light modulator 24 is reflected off the surface and directed again toward the prism 23. This light, by being reflected off a surface 23a of the prism 23, changes its direction downwardly as shown in the drawing and is concentrated with the zoom lens 26 to form an image in a predetermined position on the imaging plate 11.

Examples of the spatial light modulator 24 include a diffraction grating light valve, a digital micromirror device, a PLZT (lead lanthanum zirconate titanate) light modulator, and a liquid crystal shutter.

The spatial light modulator 24, being driven by the drive circuit 25, can selectively change reflectivity (or transmittivity) of each specific part (each unit E described later) of the spatial light modulator 24 within the range of irradiation. Thus, recording conditions can selectively be changed in different parts of the imaging plate 11.

Figure 3:
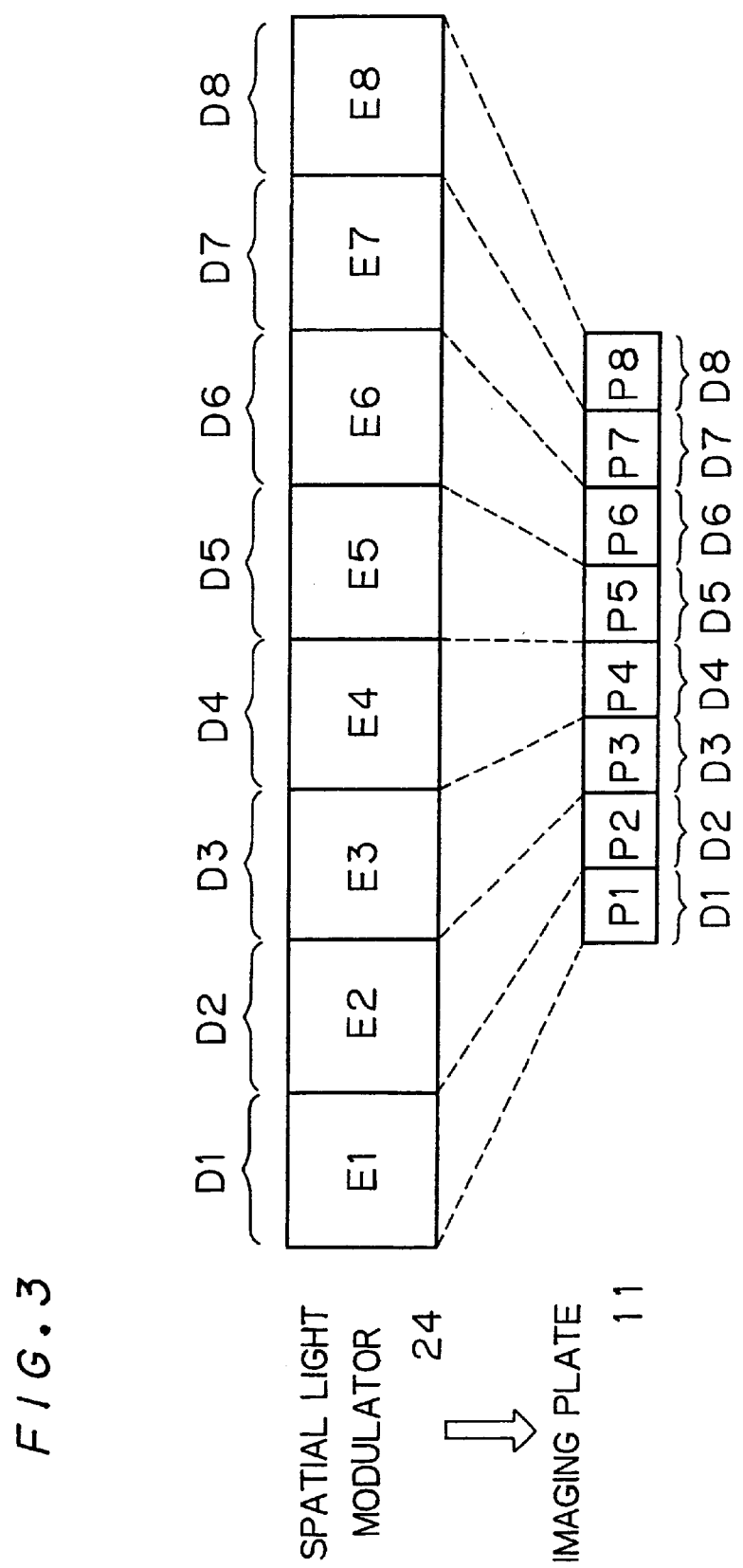
FIG. 3 shows an example of a correspondence (1:1) between pixels D and pixel units P.

As shown in FIG. 3, a one-dimensional array of units E of the spatial light modulator 24 can be projected onto the imaging plate 11. FIG. 3 illustrates the case when a one-dimensional array of the units E of the spatial light modulator 24 consists of 8 units E1 to E8. The units E1 to E8 of the spatial light modulator 24 are in a one-to-one correspondence with pixels D1 to D8 in the input image M and each represents a gradient value for a corresponding pixel D. Those units E1 to E8 are projected onto the imaging plate 11 by means of an optical system including the imaging zoom lens 26, thereby forming pixel units P1 to P8.

This projection is performed such that the pixel units P1 to P8 are arranged in the sub-scanning direction Y on the imaging plate 11, and via scanning in the main scanning direction X along with the rotation of the recording drum 10, a single scanning line of recording can be done during one rotation of the recording drum 10. As a result, an output image ME which is a group of the pixel units P is formed on the imaging plate 11 by means of the recording head 20.

Here, the output image ME has a resolution the smallest unit of which is the size of one pixel unit P. That is, the resolution of the output image ME is determined by the size of one pixel unit P which is the smallest unit expressed by the recording head 20. In this specification, therefore, the resolution of the output image ME is also referred to as "the resolution of the recording head 20 (output resolution)."

FIG. 3 illustrates the case when the pixels D1 to D8 are in a one-to-one correspondence with the pixel units P1 to P8, i.e., when "the resolution of the input image M" formed of the pixels D on the imaging plate 11 is the same as "the resolution of the recording head 20." This preferred embodiment, however, illustrates the case when "the resolution of the recording head 20" is higher than "the resolution of the input image M" in the sub-scanning direction Y. In other words, the recording head 20 outputs, as each pixel D in the input image M, a set of pixel units P that are smaller than the pixel D. This will be described in the following.

Figure 4:
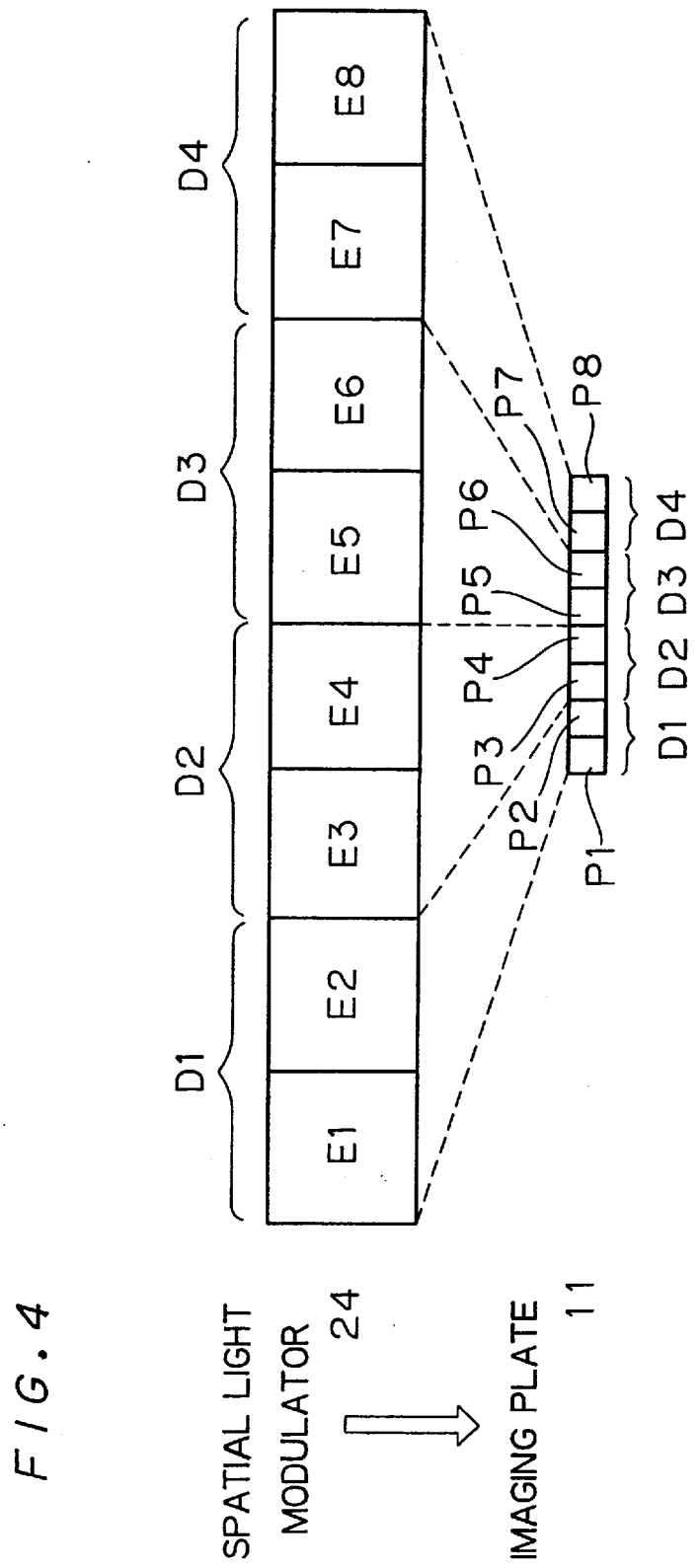
FIG. 4 shows another example of a correspondence (1:2) between the pixels D and the pixel units P.

Referring to FIG. 4, we will describe the case when each pixel D in the input image M is double the size of one pixel unit P in the output image ME. In this case, two units E1 and E2 of the spatial light modulator 24 are in correspondence with a pixel D1 in the input image M. Similarly, two units E3 and E4 are in correspondence with a pixel D2, two units E5 and E6 with a pixel D3, and two units E7 and E8 with a pixel D4. Those units E1 to E8 are projected onto the imaging plate 11 by means of the optical system including the imaging zoom lens 26, thereby forming pixel units P1 to P8.

From the above, the pixel units P1 and P2 in the output image ME are in correspondence with the pixel D1 in the input image M. Similarly, the pixel units P3 and P4 are in correspondence with the pixel D2, the pixel units P5 and P6 with the pixel D3, and the pixel units P7 and P8 with the pixel D4.

In the above projection on the imaging plate 11 by means of the optical system including the imaging zoom lens 26, the magnification of the zoom lens 26 is controlled so that an image of the same size as that of FIG. 3 is formed of a group of the pixel units P having double the density of FIG. 3. It is obvious that a similar effect can also be achieved by varying only the magnification in the sub-scanning direction Y.

Figure 5:
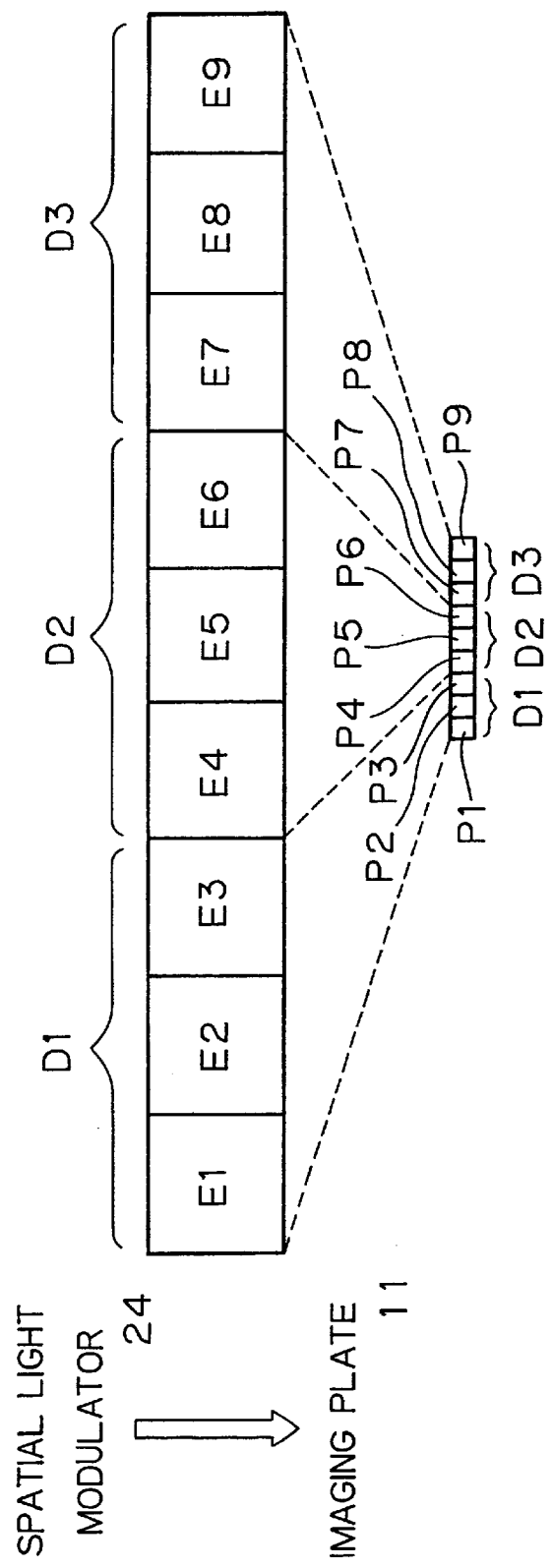
FIG. 5 shows still another example of a correspondence (1:3) between the pixels D and the pixel units P.

Referring to FIG. 5, we will describe the case when each pixel D in the input image M is three times as large as one pixel unit P in the output image ME. In this case, three units E1, E2, and E3 of the spatial light modulator 24 are in correspondence with the pixel D1 in the input image M. Similarly, units E4, E5, and E6 are in correspondence with the pixel D2, and units E7, E8, and E9 with the pixel D3. Those units E1 to E9 are projected onto the imaging plate 11 by means of the optical system including the imaging zoom lens 26, thereby forming pixel units P1 to P9. From the above, the pixel units P1, P2, and P3 in the output image ME are in correspondence with the pixel D1 in the input image M. Similarly, the pixel units P4, P5, and P6 are in correspondence with the pixel D2, and the pixel units P7, P8, and P9 with the pixel D3.

In the above projection on the imaging plate 11 by means of the optical system including the imaging zoom lens 26, the magnification of the zoom lens 26 is controlled so that an image of the same size as that of FIG. 3 is formed of a group of the pixel units P having a density of three times that of FIG. 3.

In this fashion, the size of one pixel D in the input image M is set to be an integral multiple of the size of one pixel unit P in the output image ME. To prevent output image degradation, the recording head 20 should preferably have a resolution of an integral multiple of the resolution of the input image M in the sub-scanning direction Y.

It is also possible to make variable a ratio between the resolution of the input image M and the resolution of the recording head 20. In changing the resolution ratio between the input image M and the recording head 20, the correspondence between the pixels D and the pixel units P is changed according to the resolution ratio by a resolution converter 48A (described later) in the converter 47A of FIG. 7, as well as the magnification of the zoom lens 26 is controlled under a command to change the resolution ratio setting, as above described.

In this preferred embodiment, it is assumed that the recording head 20 has the spatial light modulator 24 for allowing imaging of 8 pixels D. Each pixel D is a set of three pixel units P; therefore, 8 pixels D are equivalent to a total of 24 pixel units P. This achieves the output image ME that has a resolution of three times that of the input image M in the sub-scanning direction Y.

It is also assumed in this preferred embodiment that the size (width) of an image area of the recording head 20 in the sub-scanning direction Y is greater than the size (width) of one scanning line. The recording head 20 thus repeatedly performs imaging operations in such a manner that the scanning lines slightly overlap one another. More specifically, the image area of the recording head 20 has a width in the sub-scanning direction Y that is obtained by adding the width of one scanning line (in this case, the sum of the widths of 24 pixel units P) and a width smaller than the width of one pixel D in the input image M (in this case, the sum of the widths of two pixel units P). That is, the width of the image area of the recording head 20 is equal to the sum of the widths of a total of 26 (=24+2) pixel units P.

As above described, the spatial light modulator 24 according to this preferred embodiment has 26 units E1 to E26. By projecting light emitted from the units E1 to E26 onto the imaging plate 11 through the imaging zoom lens 26, 26 pixel units P1 to P26 can be outputted onto the imaging plate 11.

<Image Signal Processor 44>

Figure 6:
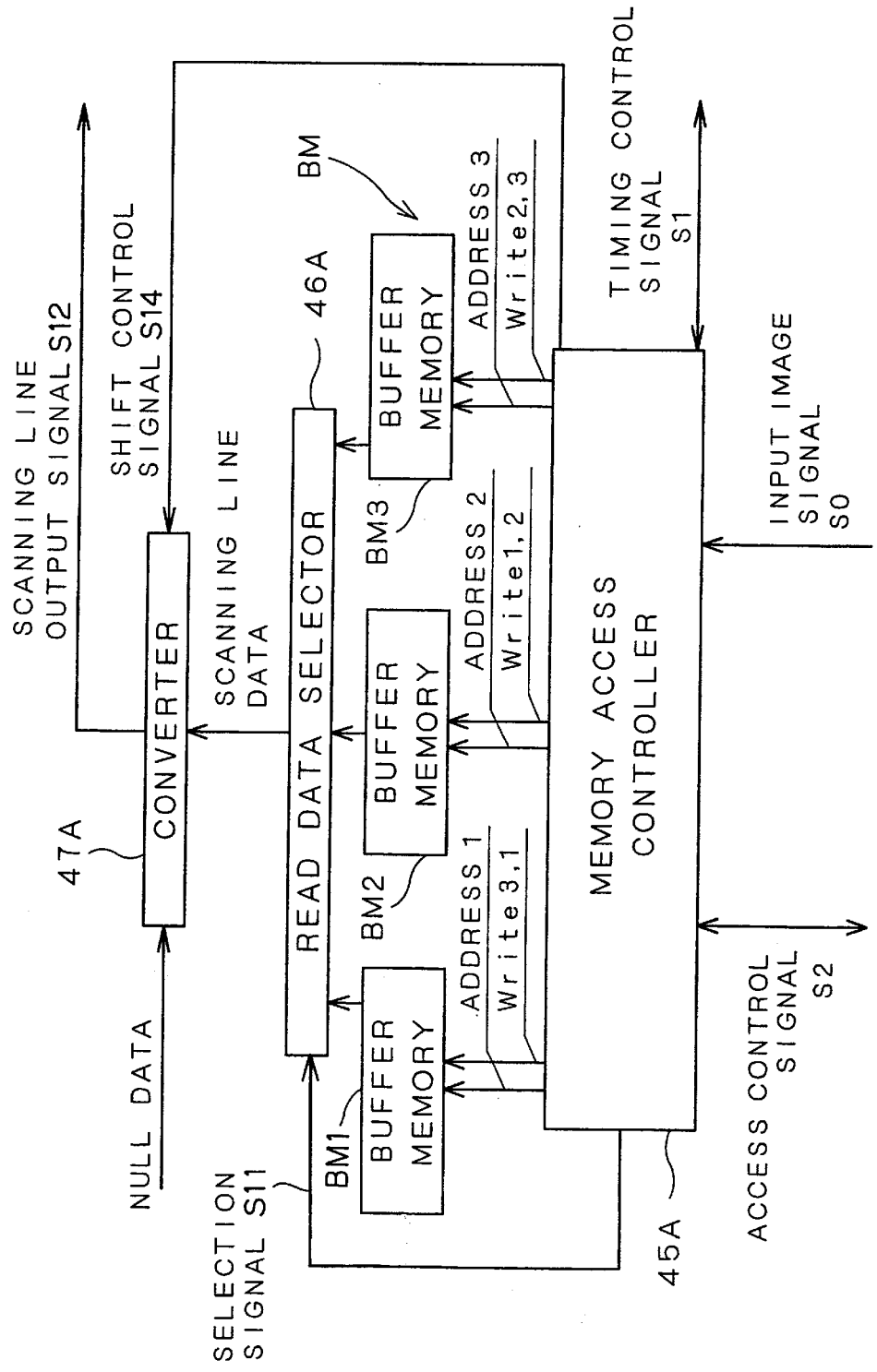
FIG. 6 is a schematic block diagram of an image signal processor 44A.

FIG. 6 is a schematic block diagram of the image signal processor 44 (44A) according to the first preferred embodiment. As shown in FIG. 6, the image signal processor 44A comprises a buffer memory BM having a storage area corresponding to three scanning lines. In the present example, the buffer memory BM is expressed as three separate buffer memories BM1, BM2, and BM3; however, in practice, a single memory may have an equivalent amount of capacity. One scanning line has a width of Na pixels (in this case, 8 pixels) in the input image M, depending on the width of imaging by the spatial light modulator 24.

The buffer memories BM1, BM2, and BM3 each have a storage area corresponding to one scanning line. For example, the buffer memory BM1 has a storage area that holds gradient values for a total of (Na×Nb) pixels in the input image M in which Na pixels are arranged in the sub-scanning direction Y and Nb pixels in the main scanning direction X. The same can be said of the other buffer memories BM2 and BM3. The buffer memory BM as a whole, therefore, substantially has a storage area corresponding to three main scans.

The image signal processor 44A further comprises a memory access controller 45A for controlling access to the three buffer memories BM1, BM2, and BM3, a read data selector 46A for switching among the buffer memories BM1, BM2, and BM3 in read-out, and the converter 47A for converting pixels D in the input image M, which are read out from the buffer memories BM1, BM2, and BM3, into pixel units P in the output image ME. Read operations from the buffer memories BM1, BM2, and BM3 are performed in accordance with a read-out clock (which is also referred to as a "main-scan clock") that is synchronized with the rotation of the recording drum 10 in the main scanning direction X.

Figure 7:
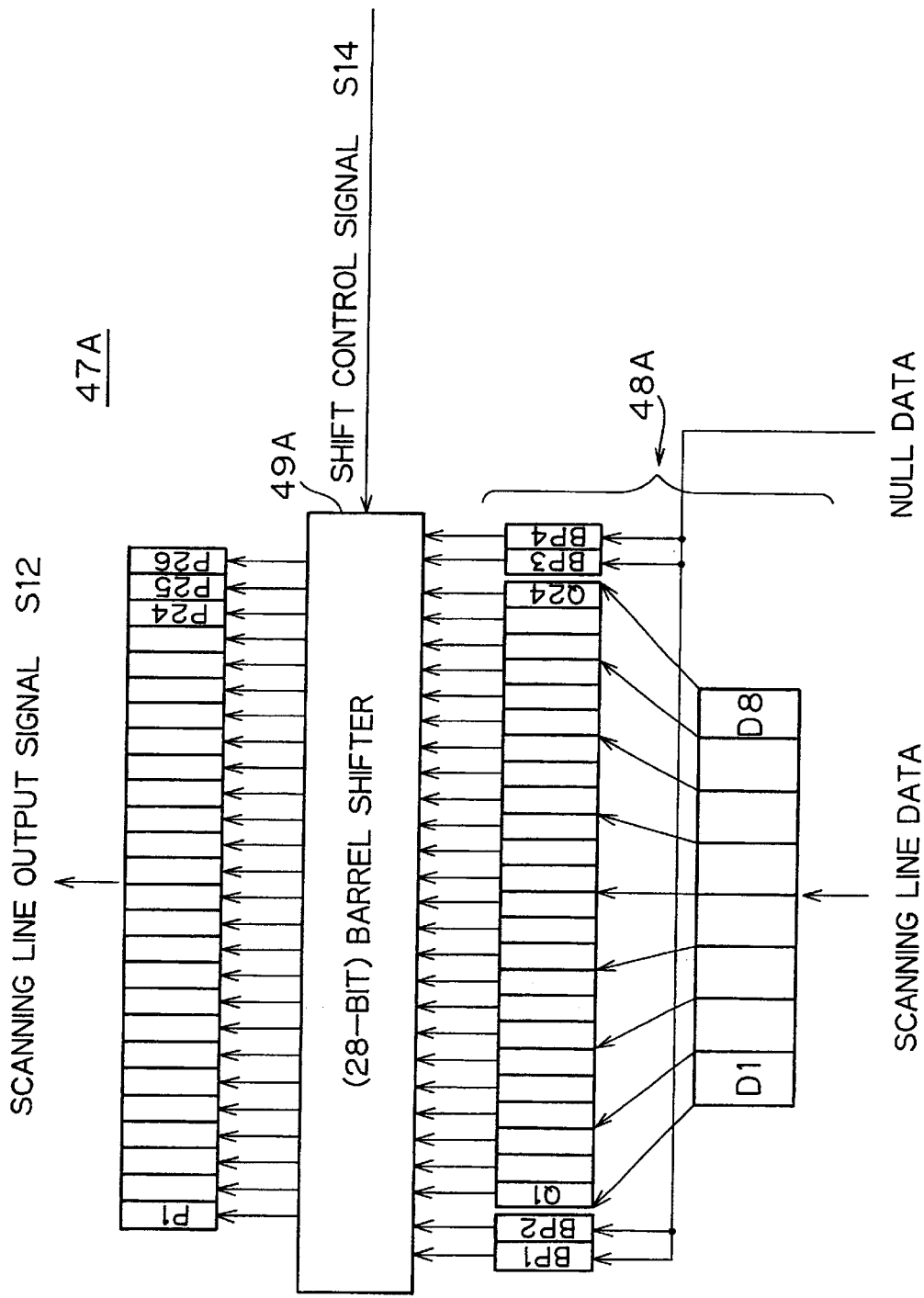
FIG. 7 is a detailed diagram of a converter 47A.

FIG. 7 is a detailed diagram of the converter 47A. As shown in FIG. 7, the converter 47A comprises the resolution converter 48A and a barrel shifter 49A. The resolution converter 48A converts pixels D read out from the buffer memories BM1, BM2, and BM3 into pixel units P to suit the resolution of the output image ME, and then outputs the result of conversion to the barrel shifter 49A. The barrel shifter 49A performs a shift operation, which will be described later, to shift and output the position of each input signal. The details of the operation will be described later.

<A2. Basic Principle>

Next, a basic principle of image distortion correction according to this preferred embodiment will be set forth. The distortion correction process can be divided into two stages: a first correction operation and a second correction operation.

<First Correction Operation>

The first correction operation, as shown in FIGS. 8A to 8C and 9A to 9C, is to correct image distortion at the resolution of an input image by setting an angle difference θd between a write angle θw (FIGS. 8A to 8C) and a read angle θr (FIGS. 9A to 9C) to be equal to an inclination angle θc of the scanning lines with respect to the main scanning direction X for access to the buffer memories BM1, BM2, and BM3. The write angle θw is the angle at which image data is written into address space in the buffer memory BM, and the read angle θr is the angle at which the image data is read out from the address space in the buffer memory BM.

In the present example, the write angle θw is determined to be equal to the inclination angle θc of scanning lines with respect to the main scanning direction X. A write operation to the buffer memory BM is performed at the angle θw and then a read operation from the buffer memory BM is performed at the angle θr of 0 as shown in FIGS. 9A to 9C, thereby to achieve the angle difference θd equal to the inclination angle θc (θd=θw−θr=θc−0=θc).

Figure 10A:
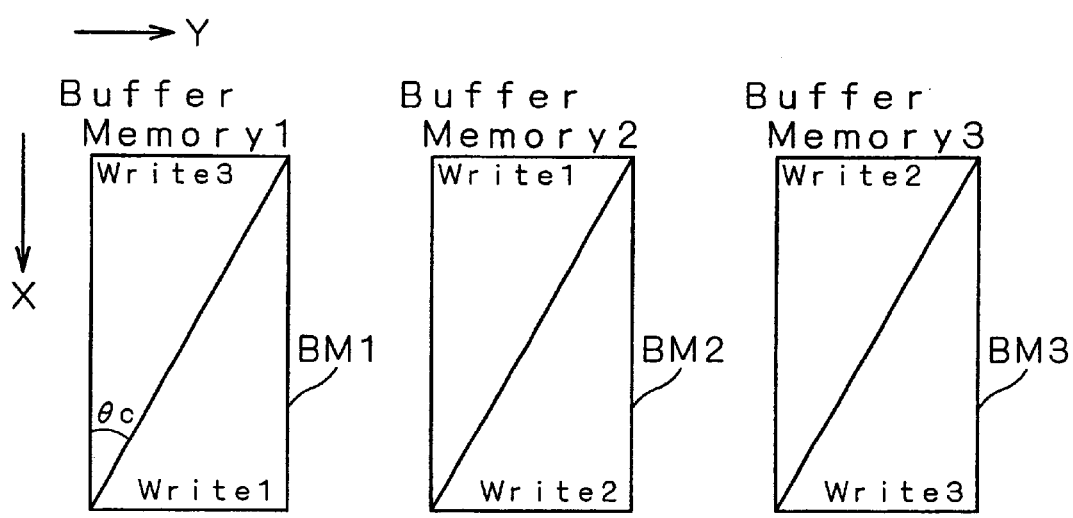
FIGS. 10A and 10B are explanatory diagrams of the access to the buffer memory BM.
Figure 10B:
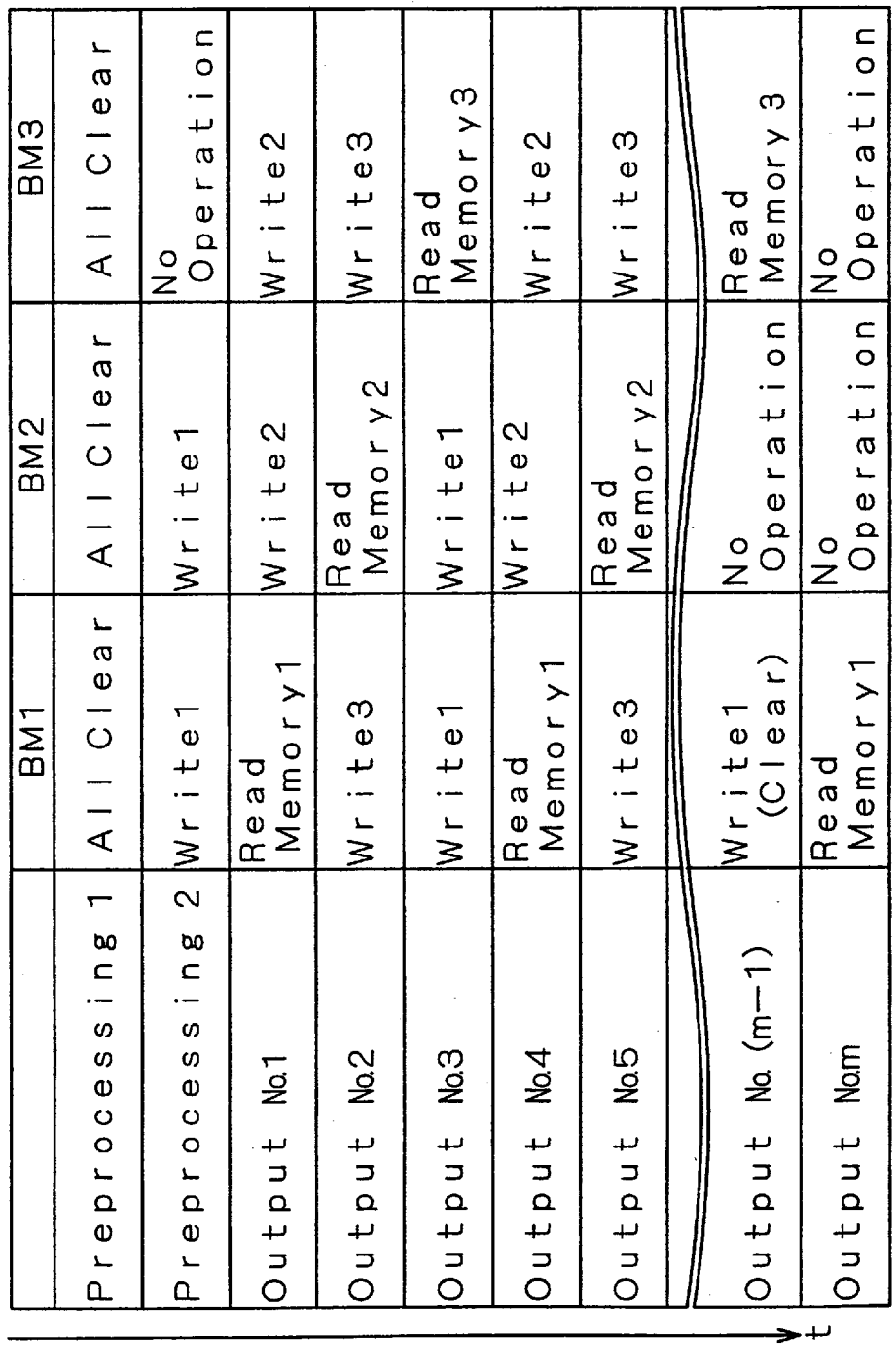
Figure 11:
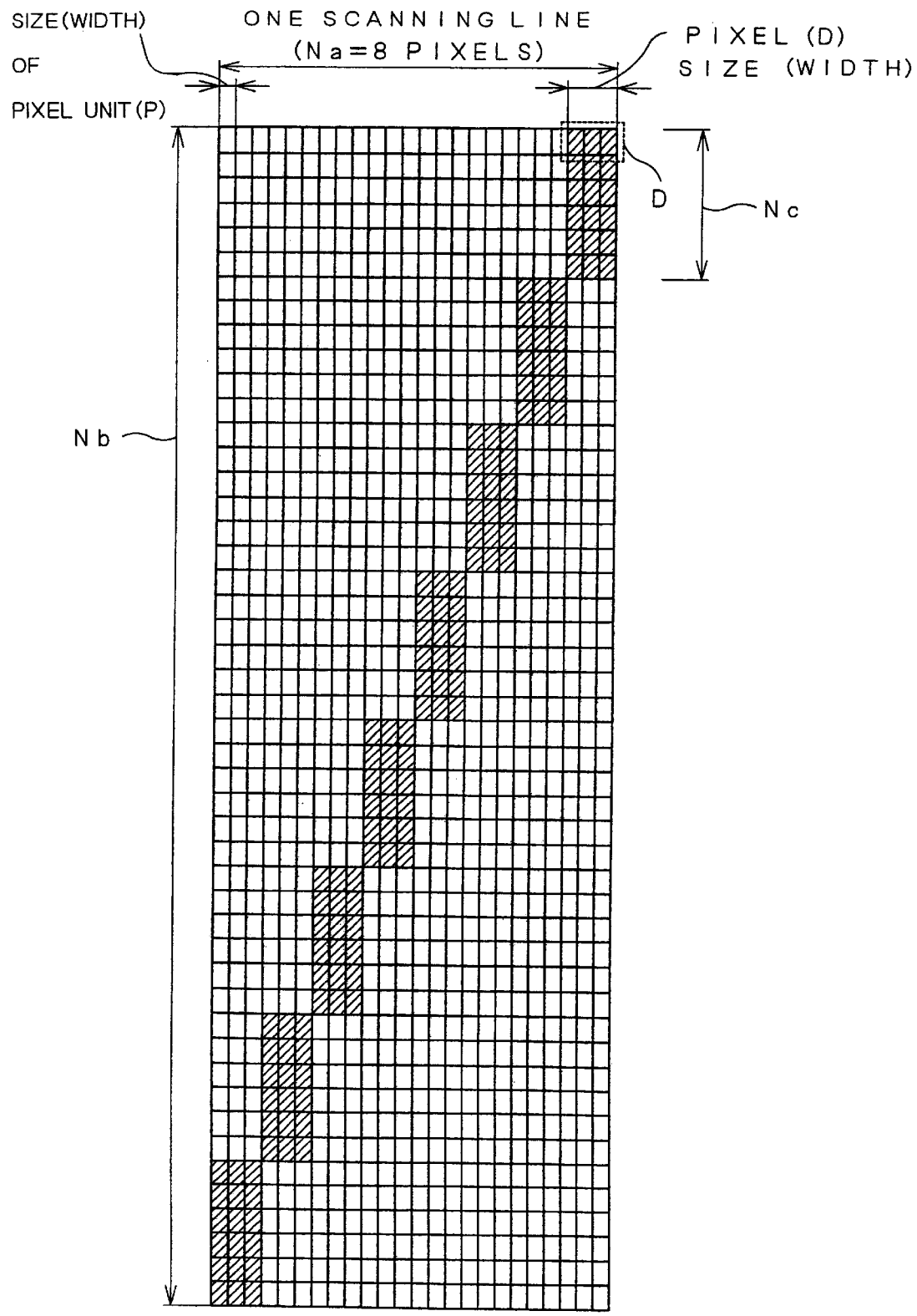
FIGS. 11 and 12 are explanatory diagrams of a first correction operation.

FIGS. 10A, 10B, 11, and 12 are explanatory diagrams of the above operations. In FIG. 11 and other drawings, each pixel D has the shape of a transversely elongated rectangular, but it desirably has the shape of a uniform square to maintain the aspect (length-to-width) ratio of an original image. For example, by setting the aspect ratio of each pixel unit P to 3:1, one pixel D expressed as a set of three pixel units P can be shaped into a uniform square.

FIG. 11 illustrates the state of one of the three buffer memories BM1, BM2, and BM3. In imaging for each scanning line having a width of 8 pixels D, when the number of pixels Nb per one rotation of the recording drum 10 is 48 as shown in FIG. 11, the inclination angle θc is expressed by Na/Nb=8/48=1/6. In other words, a write area is shifted by one pixel D for every six pixels forward in the main scanning direction X, thereby achieving the write angle θw.

Figure 12:
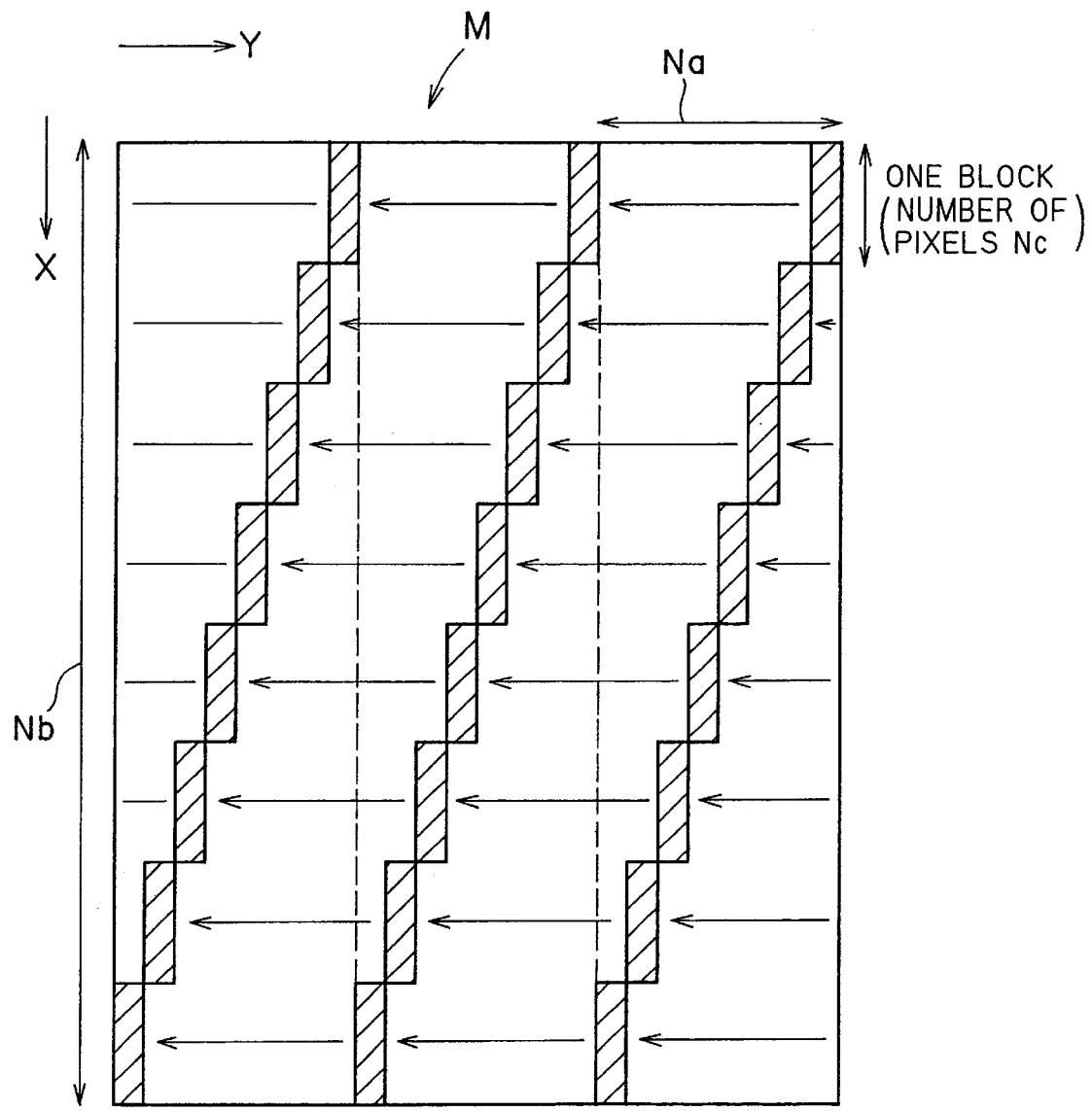

More specifically, as shown in FIG. 12, the surface area of the recording drum 10 is divided into Na blocks (in this case, 8 blocks) along the main scanning direction X and a shift in the sub-scanning direction Y is produced in blocks. In this condition, memory accesses to achieve the above angle difference θd (=θc) is made to correct image distortion. Each of the blocks has Nc pixels (Nc=Nb/Na) arranged in the main scanning direction X, the value Nc being obtained by dividing the number of pixels Nb arranged in the main scanning direction X per one rotation of the recording drum 10 by the number of pixels Na that the recording head 20 can record at a time in the sub-scanning direction Y (i.e., the width of one scanning line in the sub-scanning direction Y). Expressed differently, the buffer memory BM is divided into a plurality of blocks along the main scanning direction X on the basis of the ratio of the number of pixels Na arranged in the sub-scanning direction Y to the number of pixels Nb arranged in the main scanning direction X in the image area of the recording drum 10.

The blocks are then shifted in the sub-scanning direction Y by amounts determined for each block to achieve the aforementioned angle difference and in this condition, memory accesses are made to correct image distortion.

The diagonally shaded areas in FIGS. 11 and 12 indicate portions corresponding to the right end pixels D of write area in the input image M. Although for convenience's sake, an array of the pixel units P is illustrated in FIG. 11, the actual buffer memory BM holds gradient values for the pixels D as image data. From this, the buffer memories BM1, BM2, and BM3 each are only required to have a storage capacity corresponding to one scanning line of image data of the relatively low-resolution input image M. This prevents an increase in the storage capacity required of the buffer memory BM.

<Second Correction Operation>

Next, the second correction operation will be described.

Figure 14B:
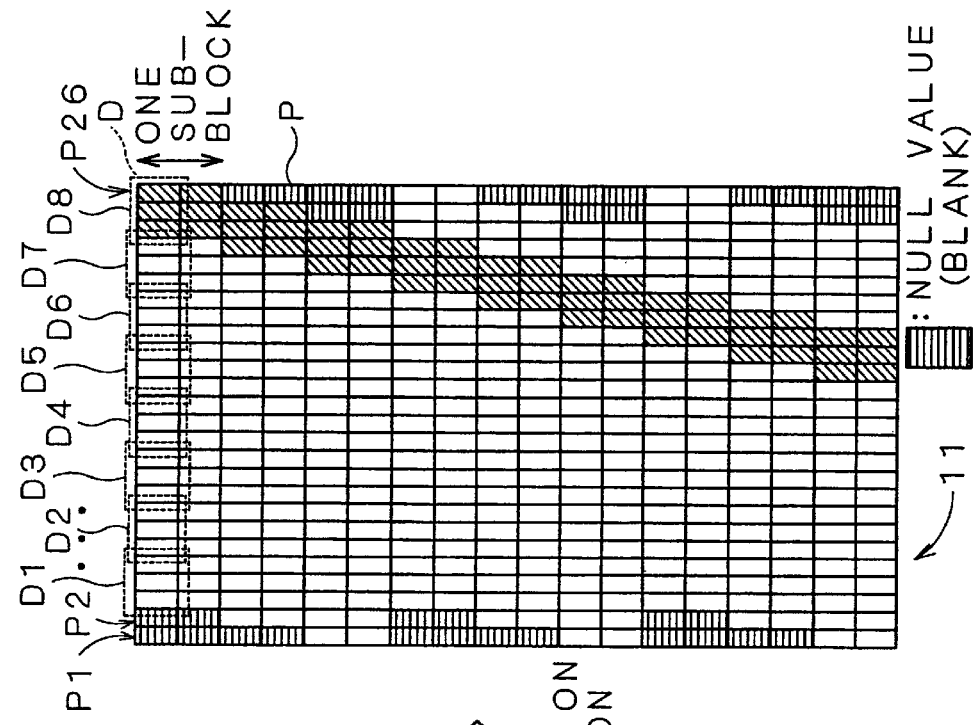
FIGS. 14A and 14B are explanatory diagrams of the second correction operation; more specifically.
Figure 14A:
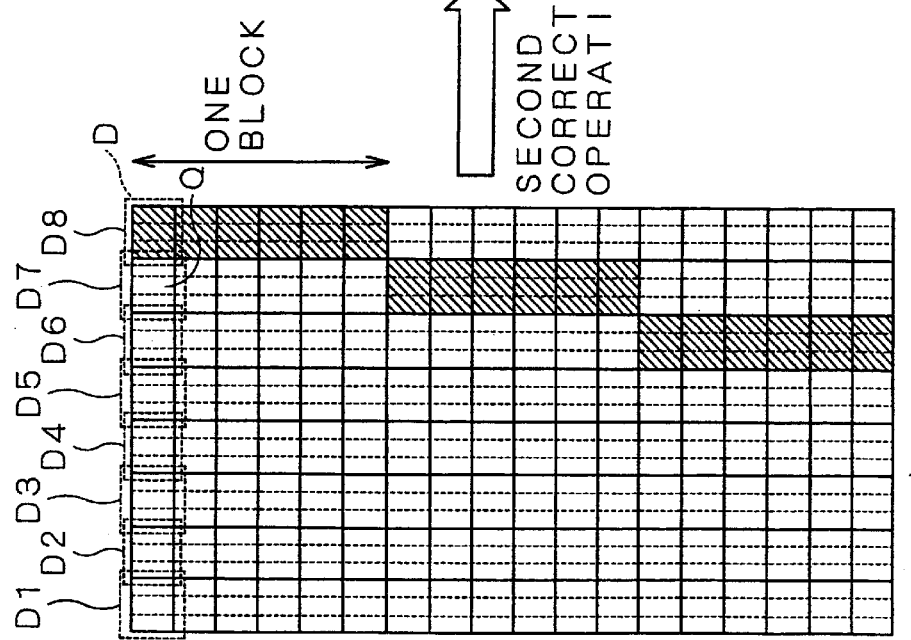

FIGS. 13, 14A, and 14B show the results obtained by the second correction operation.

The second correction operation is to correct image distortion at the resolution of the recording head 20 in the sub-scanning direction Y. In the condition after the first correction operation (cf. FIG. 11), image data read out from the address space in the memory is outputted after further being shifted in the sub-scanning direction Y by amounts responsive to the inclination angle θc. The smallest unit of the shift amount is the width of one pixel unit P.

More specifically, each block is further divided into sub-blocks on the basis of the resolution ratio between the input image M and the recording head 20, and the amount of shift responsive the inclination angle θc is determined for each of the sub-blocks. On the basis of the shift amount determined for each sub-block (i.e., preset shift amount), the positions to output the readout image data are shifted in units of the width of one pixel unit P.

Hereinbelow, the aforementioned first and second correction operations will be described in more detail.

<A3. Operation>

Initially, as "Preprocessing 1" shown in FIG. 10B, the buffer memories BM1, BM2, and BM3 are all cleared.

Then, as "Preprocessing 2", a write operation to a first area across the buffer memories BM1 and BM2 is performed. This first area, indicated by "Write 1" in FIG. 10A, includes a lower right triangular area in the buffer memory BM1 and an upper left triangular area in the buffer memory BM2. In this "Write 1" area, a predetermined rectangular portion of the input image M is written at a write angle θw (=θc).

Prior to this, an integer number Nc (=Nb/Na) is obtained by dividing the number of pixels Nb corresponding to one rotation of the recording drum 10 by the number of pixels Na corresponding to the width of one scanning line. The integer number Nc is equal to an inverse of the inclination angle θc, i.e., Nc=1/θc and in the present example, Nc=6.

The first correction operation is performed using this integer number Nc. Specifically, a write area is shifted by one pixel D in the negative Y direction for every six pixels forward in the main scanning direction X, thereby achieving the write angle θw. In more detail, under the control of the memory access controller 45A in FIG. 6, image data is written into the "Write 1" area across the buffer memories BM1 and BM2 in synchronization with the timing control signal S1 and in control of the write address. This corresponds to a write operation to the diagonally shaded area in FIG. 8A.

Then, as shown in the row of "Output No. 1" in FIG. 10B, image data written in the buffer memory BM1 is read out. At the same time, next image data is Written into a "Write 2" area across the buffer memories BM2 and BM3.

Figure 8A:
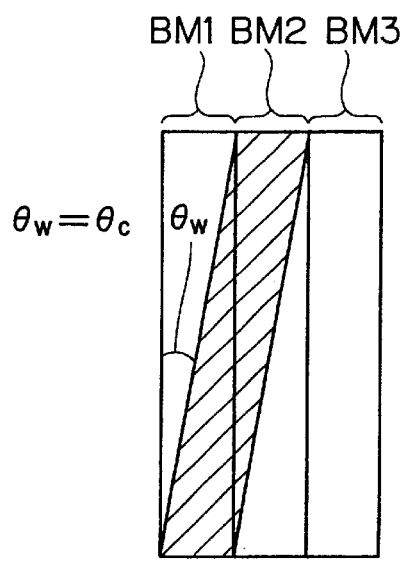
FIGS. 8A, 8B, and 8C show write operations to a buffer memory BM and each illustrates a write area at a different point in time.
Figure 8B:
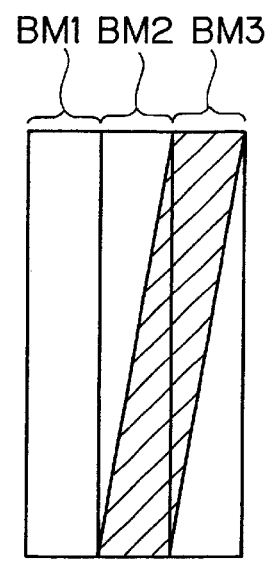
Figure 8C:
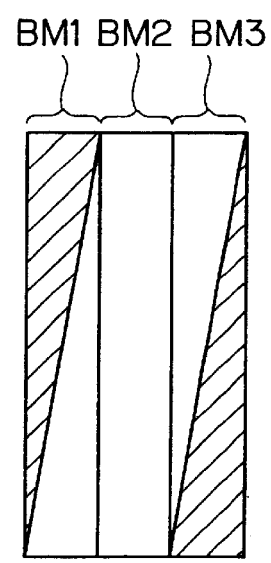

This corresponds to the states shown in FIGS. 8B and 9B. That is, a write operation to the diagonally shaded area in FIG. 8B and a read operation from the diagonally shaded area in FIG. 9B are simultaneously performed.

The read operation from the buffer memory BM1 is performed through the read data selector 46A (FIG. 6). The read data selector 46A selects the buffer memory BM1 out of the three buffer memories BM1, BM2, and BM3 and reads out image data written in the buffer memory BM1. The operation of the read data selector 46A is performed in synchronization with a selection signal S11 given from the memory access controller 45A under the control of the controller 45A. The image data read out at this time includes written data in the lower right triangular area of the buffer memory BM1 in FIG. 10A and null data in the upper left triangular area thereof.

Next, the second correction operation is performed on the readout image data. This is performed by the converter 47A (cf. FIGS. 6 and 7). Initially, as shown in FIG. 7, the resolution converter 48A in the converter 47A allocates 24 pixel units Q (Q1 to Q24) to 8 pixels D. More specifically, each of the pixels D1 to D8 is allocated three pixel units Q. Then, with predetermined timing, the barrel shifter 49A in FIG. 7 shifts the 24 pixel units Q by an amount responsive to their position with respect to the main scanning direction X, whereby the 24 pixel units Q each are outputted as any one of 26 pixel units P1 to P26. At this time, null data is assigned to those pixel units P that do not correspond to any of the pixel units Q. This determines gradient values for the 26 pixel units P1 to P26 to be outputted by the recording head 20.

The predetermined timing of the shift is determined from the integer number Nc in consideration of the resolution ratio between the input image M and the recording head 20. More specifically, the shift operations are performed by changing the amount of shift at every Ne read-out clocks, the value Ne being obtained by dividing a value Nc representing the size of one block by a following value Nd. The value Nd represents a relationship between the resolution of the input image M and the resolution of the recording head 20 and it is defined as the number of pixel units P corresponding to one pixel D in the input image M. In this preferred embodiment, Nd=3 and thus, Ne=Nc/Nd=6/3=2. In the shift operations, therefore, the amount of shift is changed at every two read-out clocks. The shift operations are also performed in synchronization with a shift control signal S14 from the memory access controller 45A.

FIGS. 14A and 14B illustrate the shift operations. Initially, 24 pixel units Q corresponding to 8 pixels D which are read out at a first point in time (on the top line) and two null values added to the left end of the 24 pixel units, i.e., a total of 26 pixel units P1 to P26 are outputted as a scanning line output signal S12 (FIG. 7). More specifically, the barrel shifter 49A in FIG. 7 assigns null values to the pixel units P1 and P2, a gradient value for the pixel D1 to the pixel units P3 to P5, and a gradient value for the pixel D2 to the pixel units P6 to P8. In a similar fashion, gradient values for the pixels D3 to D8 are assigned to the pixel units P9 to P26. As a result, the scanning line output signal S12 consisting of the pixel units P1 to P26 is outputted. The spatial light modulator drive circuit 25 (FIG. 2) drives the spatial light modulator 24 in accordance with the scanning line output signal S12, whereby the pixel units P1 to P26 are outputted onto the imaging plate 11. This condition is herein referred to as a reference condition in the shift operations.

FIGS. 14A and 14B are schematic explanatory diagrams of the output image ME to be formed on the imaging plate 11. FIG. 14A illustrates an array of pixels D read out from the buffer memory BM, and FIG. 14B illustrates an array of pixel units P to be outputted after the shift operations. In FIG. 14A, there is shown a virtual correspondence between pixel units P and pixels D before the shift operations.

The same as just described is also performed on subsequent 8 pixels D (on the second line from the top).

Next, gradient values for subsequent 8 pixels D (on the third line from the top) are converted by the resolution converter 48A (FIG. 7) into gradient values for 24 pixel units P and then outputted after being shifted to the left from the reference condition by an amount corresponding to one pixel unit P. The barrel shifter 49A outputs a total of 26 pixel units P including 24 pixel units P corresponding to the gradient values for 8 pixels D and two null values added to the left and right ends of the 24 pixel units P. In other words, image data read out from the address space in the buffer memory BM1 is outputted after being shifted in the sub-scanning direction Y (more specifically, in the negative Y direction) by an amount responsive to the inclination angle θc. The smallest unit of the shift amount is one pixel unit P. This shift responsive to the inclination angle θc is performed in a direction opposite to the direction of the relative movement (positive Y direction) between the recording head 20 and the recording drum 10.

In more detail, the barrel shifter 49A assigns a null value to the pixel unit P1, the gradient value for the pixel D1 to the pixel units P2 to P4, and the gradient value for the pixel D2 to the pixel units P5 to P7. In a similar fashion, the gradient values for the pixels D3 to D8 are assigned to the pixel units P8 to P25. Further, a null value is assigned to the pixel unit P26.

The same as just described is also performed on subsequent 8 pixels D (on the fourth line from the top).

Next, gradient values for subsequent 8 pixels D (on the fifth line from the top) are converted by the resolution converter 48A into gradient values for 24 pixel units P and then outputted after being shifted to the left from the reference condition by an amount corresponding to two pixel units P. The barrel shifter 49A outputs a total of 26 pixel units P including 24 pixel units P corresponding to the gradient values for 8 pixels D and two null values added to the right end of the 24 pixel units P. The same is also performed on subsequent 8 pixels D (on the sixth line from the top).

In more detail, the barrel shifter 49A assigns the gradient value for the pixel D1 to the pixel units P1 to P3 and the gradient value for the pixel D2 to the pixel units P4 to P6. In a similar fashion, the gradient values for the pixels D3 to D8 are assigned to the pixel units P7 to P24. Further, null values are assigned to the pixel units P25 and P26.

Next, subsequent 8 pixels D (on the seventh line from the top) are subjected to the same operation as performed on the first 8 pixels (on the first line). Hereinafter, the same operations as above described are repeated in sequence until the imaging operation for the first scanning line is completed.

As has been described above, each block is further divided into sub-blocks on the basis of the resolution ratio between the input image M and the recording head 20 and the amount of shift responsive to the inclination angle θc is determined for each sub-block in units of the width of one pixel unit P. After that, image data read out in units of the width of one pixel unit P is shifted by the determined shift amount (preset shift amount). In this way, the output for the first scanning line is done.

Next, an imaging operation for a second scanning line is performed. As shown in the row of "Output No. 2" in FIG. 10B, image data is written into a "Write 3" area across the buffer memories BM1 and BM3, and image data in the buffer memory BM2 is read out. This corresponds to the states shown in FIGS. 8C and 9C. That is, a write operation to the diagonally shaded area in FIG. 8C and a read operation from the diagonally shaded area in FIG. 9C are simultaneously performed.

Then, the second correction operation is performed on the readout image data, the result of which is outputted on the imaging plate 11 by means of the recording head 20.

The recording head 20 has an image area greater in width than one scanning line in the sub-scanning direction Y; therefore, imaging is performed such that the scanning lines slightly overlap one another. More specifically, image areas each having a total of 26 pixel units P arranged in the sub-scanning direction Y overlap at portions corresponding to the widths of two pixel units P. In imaging for the second scanning line, the two pixel units P1 and P2 at the left end of the second scanning line overlap with the two pixel units P25 and P26 at the right end of the first scanning line. This minimizes detection of a gap between each scanning line. Since the amount of overlap is smaller than the width of one pixel D in the input image M (in this case, the sum of the widths of two pixel units P), the required storage capacity can be minimized with a minimum amount of overlap.

Further, through the same first and second correction operations as above described, image data for the second scanning line is shifted in the same direction by the same amount as that for the first scanning line. Thus, blank areas (P) on the right side of the first scanning line is imaged (exposed to light) in accordance with actual data that has been shifted to the left end of the second scanning line. This allows continuous imaging in the sub-scanning direction Y without multiple exposure. In this way, the imaging operation for the second scanning line is completed.

Next, an imaging operation for a third scanning line is performed. As shown in the row of "Output No. 3" in FIG. 10B, image data is written into the "Write 1" area across the buffer memories BM1 and BM2, and image data in the buffer memory BM3 is read out. This corresponds to the states shown in FIGS. 8A and 9A. That is, a write operation to the diagonally shaded area in FIG. 8A and a read operation from the diagonally shaded area in FIG. 9B are simultaneously performed. As shown in FIGS. 8A to 8C and 9A to 9C, write and read areas in the buffer memories BM1, BM2, and BM3 can be complementarily and circularly switched without overlap, which minimizes memory capacity.

Then, the aforementioned second correction operation is performed on the readout image data, the result of which is outputted on the imaging plate 11 by means of the recording head 20.

Hereinafter, a repetition of like operations achieves continuous output for the scanning lines.

In the case of the last scanning line, one half of image data is actual data relating to the last scanning line and the other half is null data. Such image data is read out from the buffer memory BM and is outputted after the second correction operation.

In this fashion, the image recorder 1A of this preferred embodiment performs the first correction operation at the resolution of the input image M and performs the second correction operation at the more precise resolution of the recording head 20. This achieves smooth distortion correction. Besides, memory accesses are made in pixels D, which minimizes an increase in the capacity of the buffer memory BM.

In the image recorder 1A, the image area of the recording head 20 is greater in width than one scanning line in the sub-scanning direction Y. This enables overlapping imaging and thereby minimizes detection of a gap between each scanning line.

Further in the image recorder 1A, the width of the image area of the recording head 20 in the sub-scanning direction Y is equal to a sum of the width of one scanning line and a width smaller than the width of one pixel in the input image M. Resultant overlapping imaging minimizes detection of a gap between each scanning line and reduces the required storage capacity with a minimum amount of overlap.

A gap between each scanning line can further be minimized by making the amount of overlap equal to or greater than the width of one pixel D in the input image M. This can be achieved with ease by increasing the number of bits in the converter 47A in the configuration of FIGS. 6 and 7 and varying the size of blocks and the amount of shift in the sub-scanning direction Y in the first correction operation.

More specifically, in the first correction operation, the write area is shifted in the negative Y direction by two pixels for every 12 pixels forward in the main scanning direction X, instead of the case of FIG. 14A, thereby achieving the write angle θw. That is, the number of pixels Nc arranged in the main scanning direction X in each block is doubled (i.e., 12 pixels) and the amount of shift of the write area is set to be two pixels D. Then, after each block with 12 pixels D arranged in the main scanning direction X is further divided into 6 sub-blocks, the second correction operation is performed as follows. The top sub-block (including the first and second pixel lines from the top) is outputted as-is without being shifted, and the second sub-block (including the third and fourth pixel lines from the top) is outputted after being shifted by one pixel unit P in the negative Y direction. Similarly, the third sub-block (including the fifth and sixth pixel lines from the top) is outputted after being shifted by two pixel units P in the negative Y direction; the fourth sub-block (including the seventh and eighth pixel lines from the top) is outputted after being shifted by three pixel units P in the negative Y direction; the fifth sub-block (including the ninth and tenth pixel lines from the top) is outputted after being shifted by four pixel units P in the negative Y direction; and the sixth sub-block (including the eleventh and twelfth pixel lines from the top) is outputted after being shifted by five pixel units P in the negative Y direction. At this time, a total of 29 pixel units P are outputted with null values assigned to those pixel units P located where no pixels D have been shifted. In this way, the second correction operation is performed on the first block. The same is performed on the second through fourth blocks, thereby achieving smooth distortion correction as illustrated in FIG. 14B.

In this case, since the sixth sub-block is shifted by five pixel units P in the negative Y direction, the amount of overlap becomes greater than the width of one pixel D (=3 pixel units P) in the input image M; more specifically, the amount of overlap becomes 5 pixel units P. Such overlapping imaging can further minimize detection of a gap between each scanning line.

<B. Second Preferred Embodiment>

<B1. Configuration>

Next, the image recorder 1B according to a second preferred embodiment will be set forth. The image recorder 1B of the second preferred embodiment is identical in configuration to the image recorder 1A of the first preferred embodiment; therefore, we will concentrate on the differences therebetween in the following description.

In the second preferred embodiment, the recording head 20 has an image area of the same width as one scanning line in the sub-scanning direction Y. Thus, imaging is repeatedly performed without overlapping of the scanning lines. More specifically, the image area of the recording head 20 has the same width as one scanning line in the sub-scanning direction Y, i.e., the width equal to the sum of the widths of 24 pixel units P.

Figure 15:
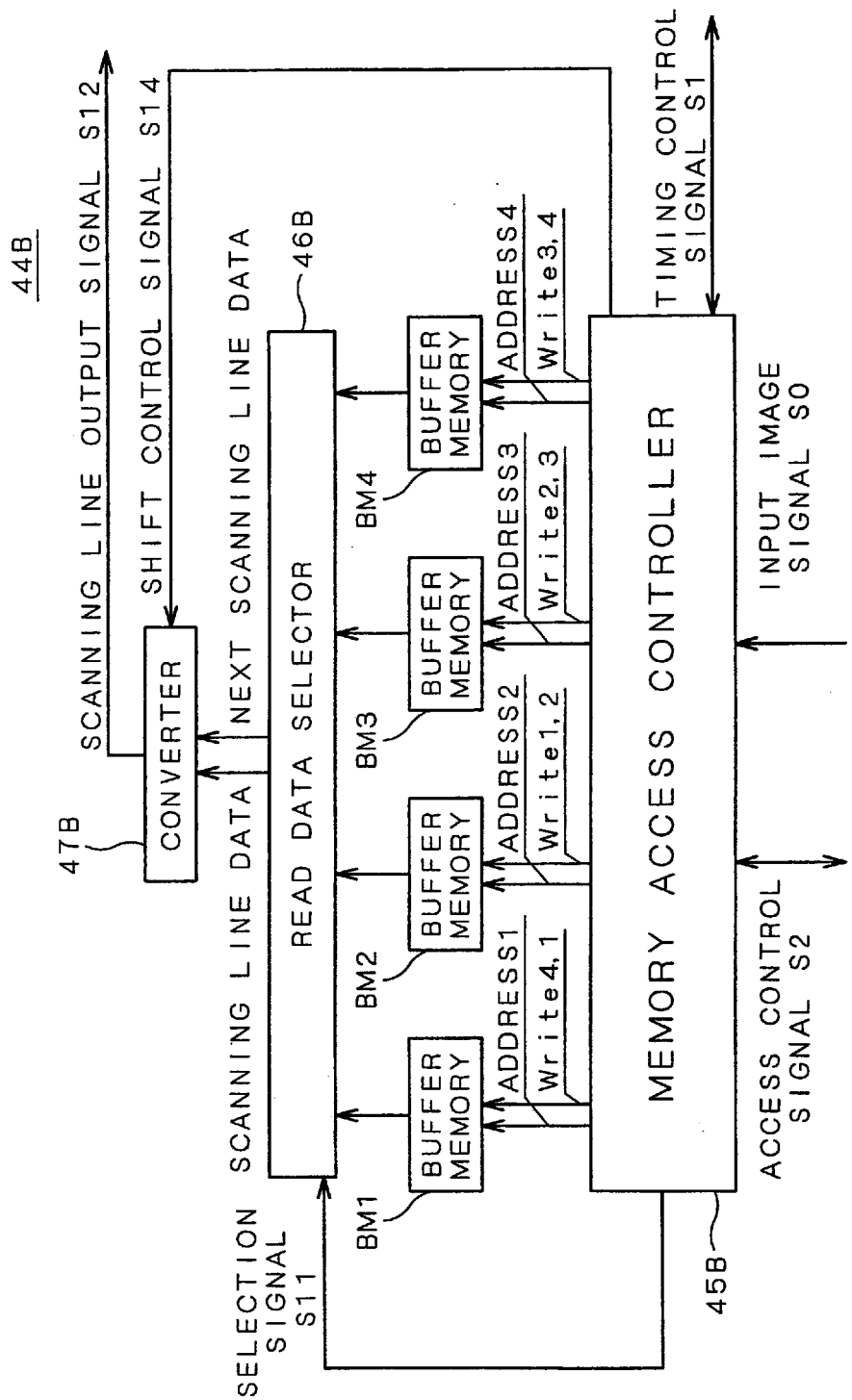
FIG. 15 is a schematic block diagram of an image signal processor 44B according to the second preferred embodiment.

FIG. 15 is a schematic block diagram of the image signal processor 44 (44B) according to the second preferred embodiment. As shown in FIG. 15, the image signal processor 44B comprises a buffer memory BM having a storage area corresponding to four scanning lines. In the present example, the buffer memory BM is expressed as four separate buffer memories BM1, BM2, BM3, and BM4 for conveniences' sake. One scanning line has a width of Na pixels (in this case, 8 pixels) in the input image M in accordance with the width of imaging by the spatial light modulator 24. The buffer memories BM1, BM2, BM3, and BM4 each have a storage area corresponding to one scanning line. The buffer memory BM as a whole, therefore, substantially has a storage area corresponding to four main scans.

In this second preferred embodiment, the provision of the four buffer memories BM1 to BM4 allows "continued" repetition of imaging for the scanning lines without overlapping of the scanning lines and with a maximum use of the width of the image area of the recording head 20.

The image signal processor 44B further comprises a memory access controller 45B for controlling access to the four buffer memories BM1 to BM4, a read data selector 46B for switching among the buffer memories BM1 to BM4 in read-out, and a converter 47B for converting pixels D in the input image M, which are read out from the buffer memories BM1 to BM4, into pixel units P in the output image ME.

Figure 16:
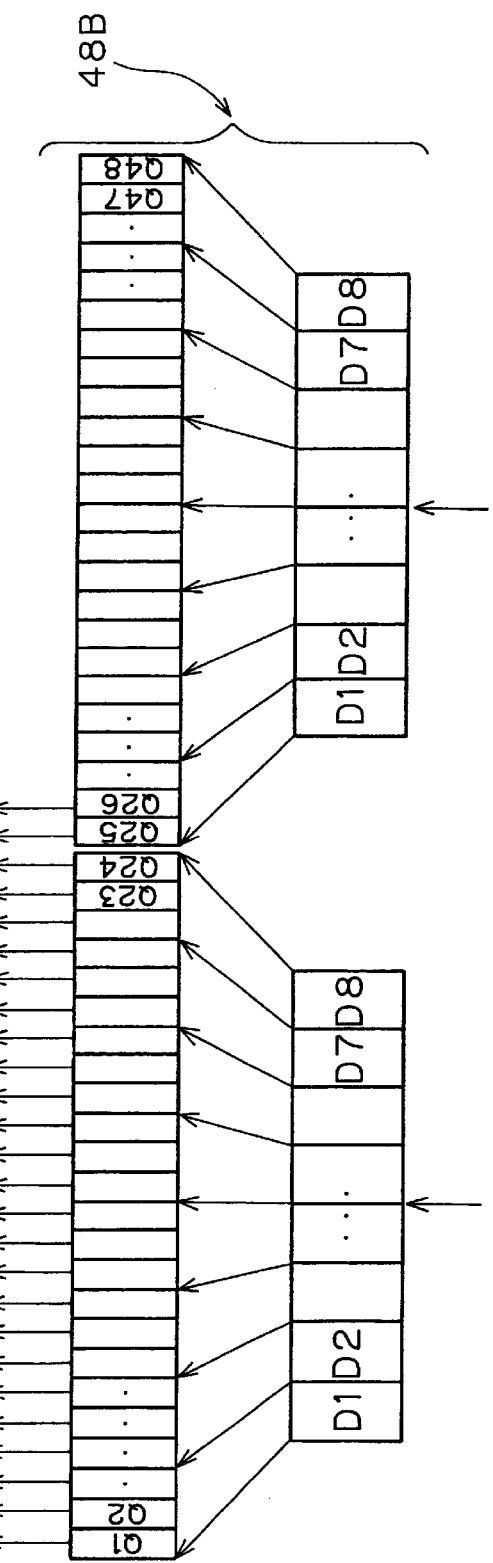
FIG. 16 is a detailed diagram of a converter 47B.

FIG. 16 is a detailed diagram of the converter 47B. As shown in FIG. 16, the converter 47B comprises a resolution converter 48B and a barrel shifter 49B. The resolution converter 48B converts pixels D read out from the buffer memories BM1, BM2, BM3, and BM4 into pixels units P to suit the resolution of the output image ME, and then outputs the result of conversion to the barrel shifter 49B. The barrel shifter 49B performs a shift operation, which will be described later, to shift and output the position of each input signal. In the second preferred embodiment, imaging is performed with no overlap; therefore, the barrel shifter 49B determines gradient values for the 24 pixel units P by also using gradient values for pixels D of a pre-read next scanning line. The details of the operation will be described below.

<B2. Operation>

Figure 17A:
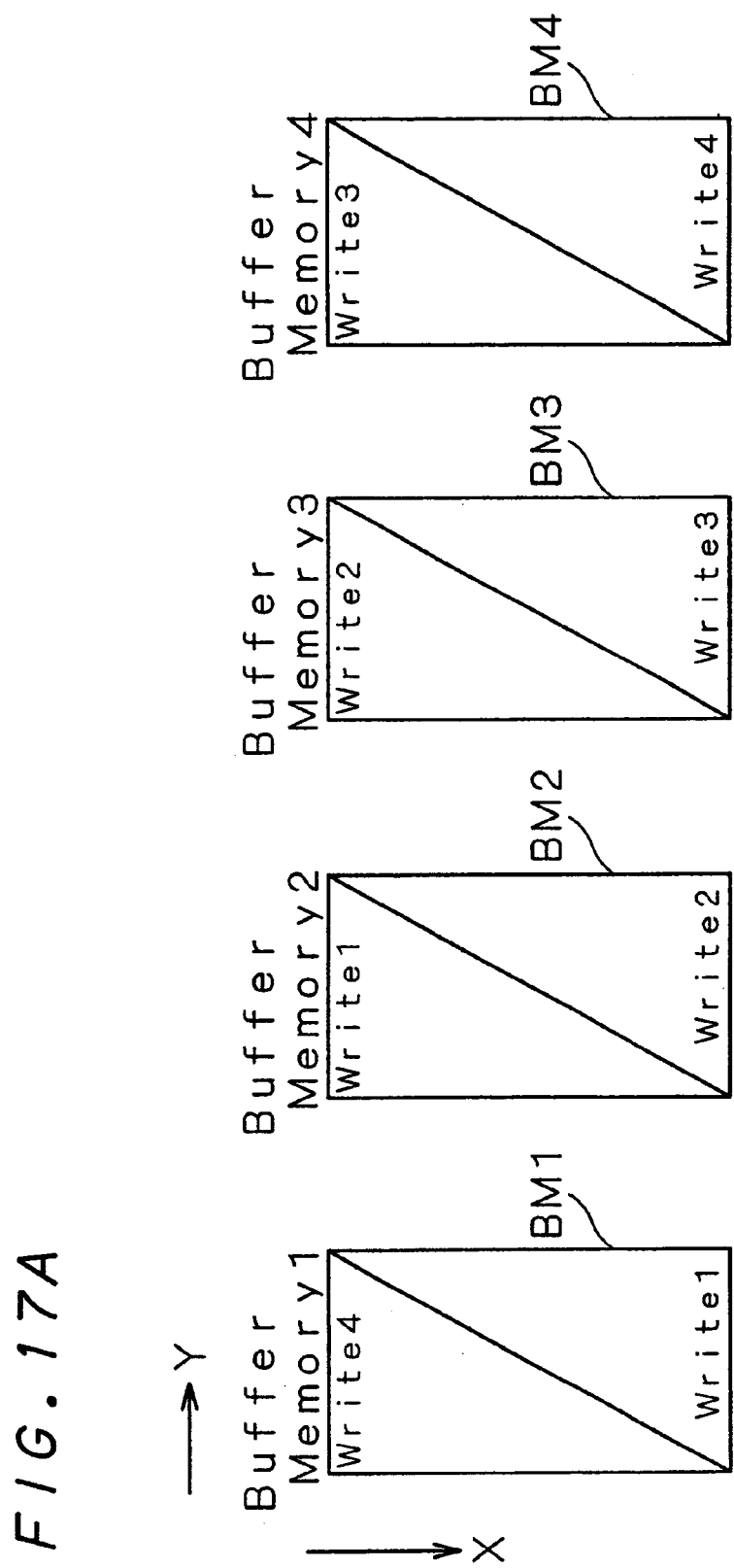
FIGS. 17A and 17B are explanatory diagrams of the access to the buffer memory BM.
Figure 17B:
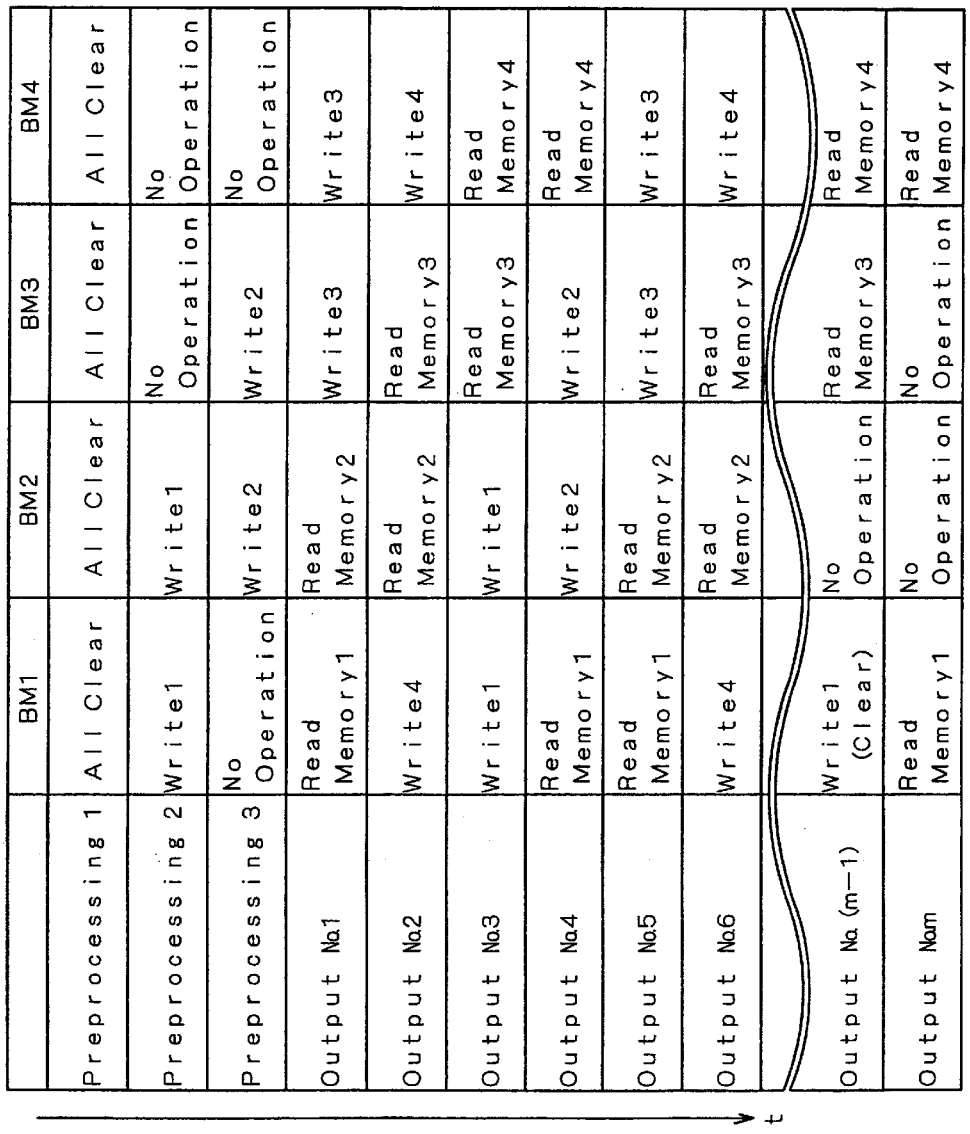

Referring now to the explanatory diagrams of FIGS. 17A and 17B, the operation of the image recorder 1B according to the second preferred embodiment will be set forth.

Initially, as "Preprocessing 1" shown in FIG. 17B, the buffer memories BM1, BM2, BM3, and BM4 are all cleared.

Then, as "Preprocessing 2", a write operation to a first area across the buffer memories BM1 and BM2 is performed. This first area, indicated by "Write 1" in FIG. 17A, includes a lower right triangular area in the buffer memory BM1 and an upper left triangular area in the buffer memory BM2. In this "Write 1" area, a predetermined rectangular portion of the input image M is written at a write angle θw (=θc). This write operation is identical to that described in the first preferred embodiment.

Then, as shown in the row of "Preprocessing 3" in FIG. 17B, next image data is written into a "Write 2" area across the buffer memories BM2 and BM3. At this point in time, image data in the buffer memory BM1 is not yet read out.

Then, as shown in the row of "Output No. 1" in FIG. 17B, next image data is written into a "Write 3" area across the buffer memories BM3 and BM4 and image data in the buffer memories BM1 and BM2 are read out.

The read operations from the buffer memories BM1 and BM2 are performed through the read data selector 46B (FIG. 15). The read data selector 46B selects the buffer memories BM1 and BM2 out of the four buffer memories BM1 to BM4 and reads out image data written in the buffer memories BM1 and BM2. The operation of the read data selector 46B is performed in synchronization with a selection signal S11 given from the memory access controller 45B under the control of the controller 45B. The image data read out at this time includes, as shown FIG. 17A, null data in the upper left triangular area "Write 4" in the buffer memory BM1, data in the lower right triangular area "Write 1" in the buffer memory BM1, data in the upper left triangular area "Write 1" in the buffer memory BM2, and data in the lower right triangular area "Write 2" in the buffer memory BM2.

Next, the second correction operation is performed on the readout image data. This is performed by the converter 47B (cf. FIGS. 15 and 16). Initially, as shown in FIG. 16, the resolution converter 48B in the converter 47B allocates 24 pixel units Q (Q1 to Q24) to 8 pixels D in the buffer memory BM1 and another 24 pixel units Q (Q25 to Q48) to 8 pixels D in the buffer memory BM2. More specifically, each of the 8 pixels D1 to D8 in the buffer memory BM1 is allocated three pixel units Q to determine gradient values for 24 pixel units Q1 to Q24, and each of the 8 pixels D1 to D8 in the buffer memory BM2 are allocated three pixel units Q to determine gradient values for another 24 pixel units Q25 to Q48.

In the present example, the gradient values for a total of 48 pixel units Q are determined; however, it is not always necessary to determine the gradient values for all the pixel units Q. In fact, it is sufficient to determine, in addition to the gradient values for the 24 pixel units Q1 to Q24 corresponding to 8 pixels D1 to D8 in the buffer memory BM1, the gradient values for only the left-side two pixels Q25 and Q26 out of three pixel units Q corresponding to a first pixel D1 in the buffer memory BM2.

Figure 18:
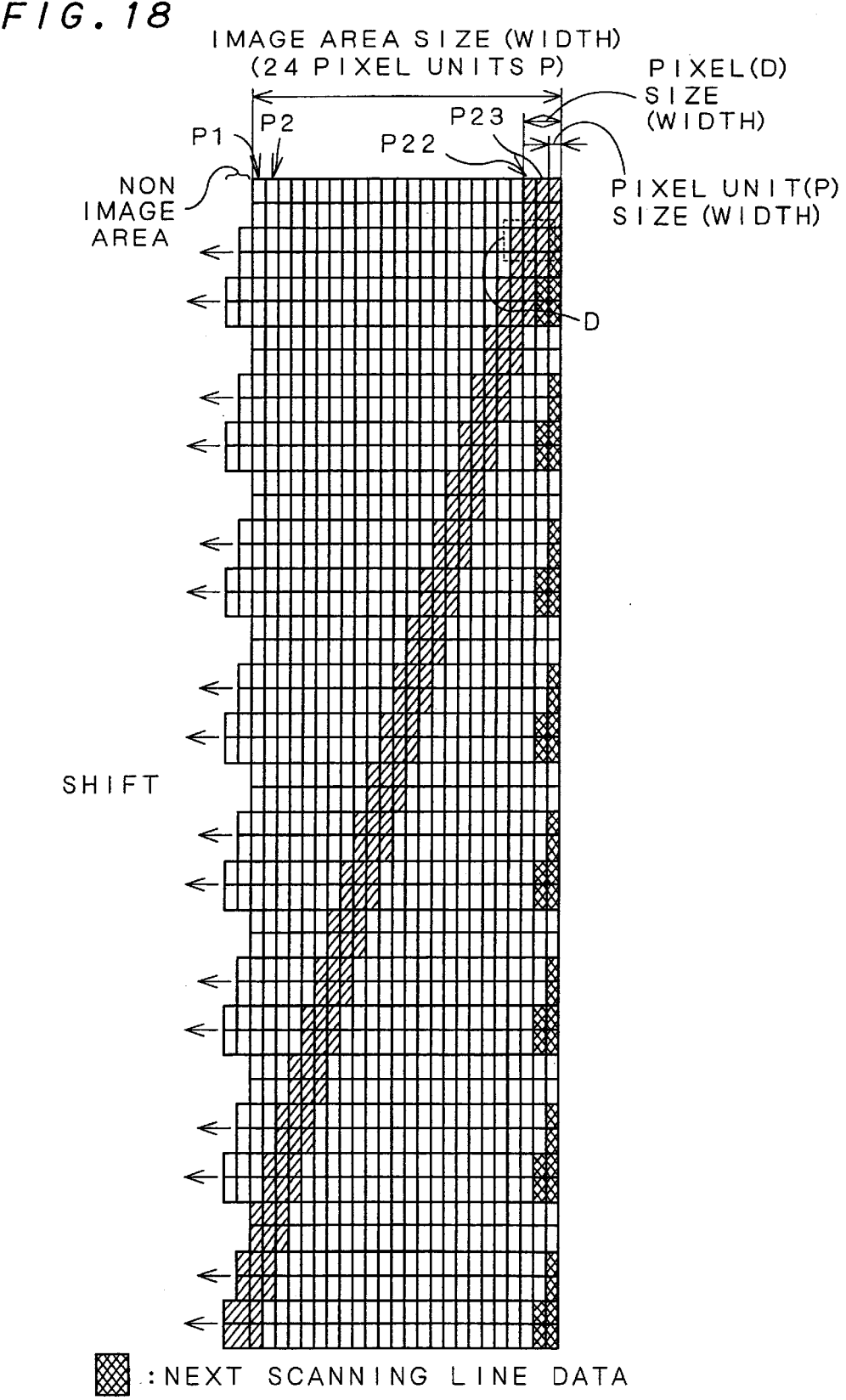
FIG. 18 is an explanatory diagram of the second correction operation.
Figure 19:
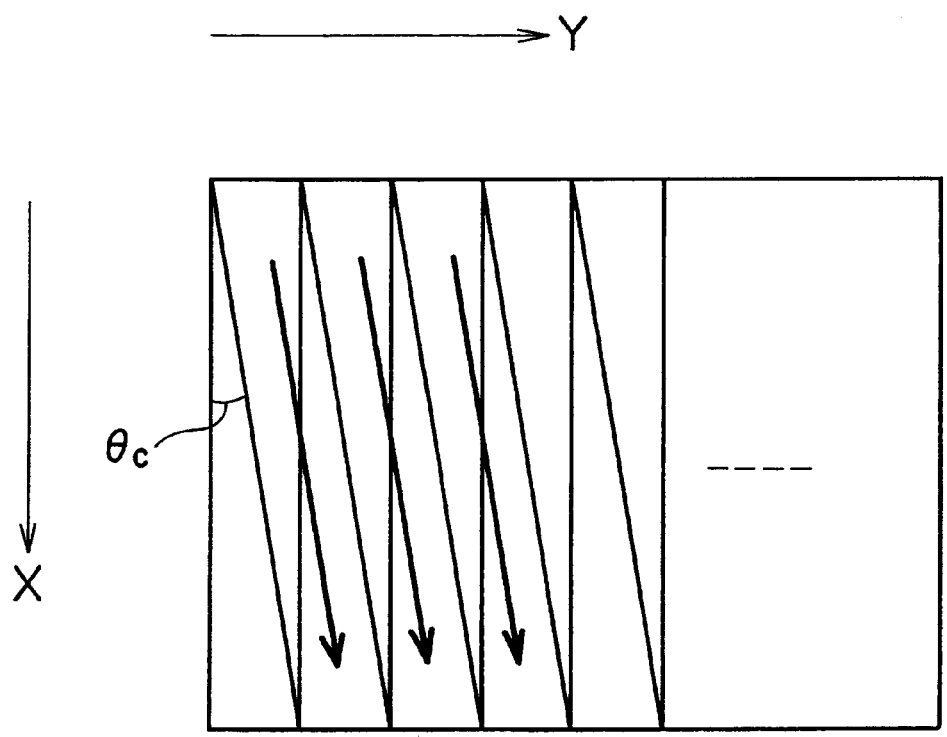
FIG. 19 illustrates image distortion.
Figure 20:
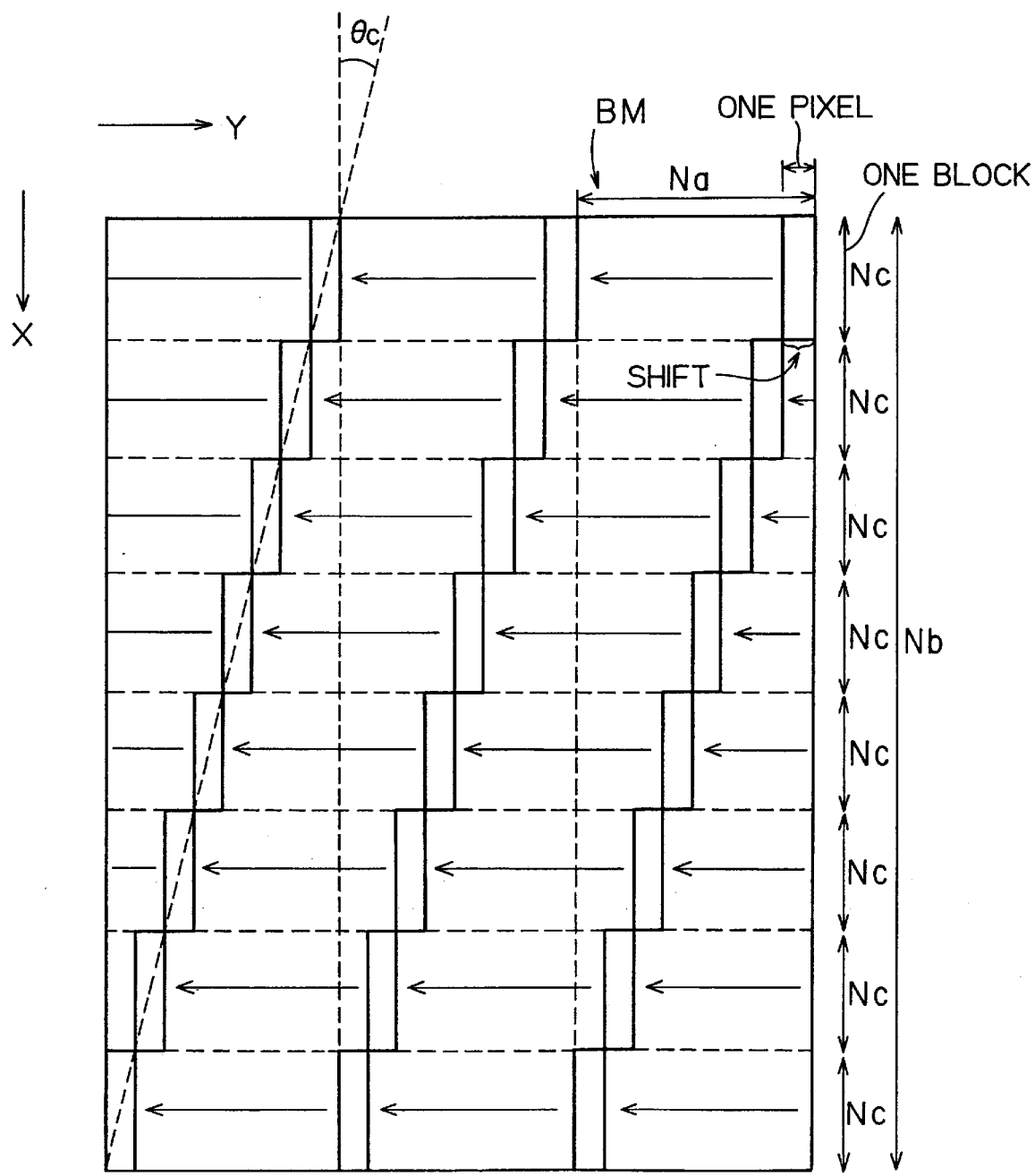
FIG. 20 is an explanatory diagram of the image distortion correction according to a conventional technique.

The barrel shifter 49B in FIG. 16 then shifts those 26 pixel units Q1 to Q26, with predetermined timing, by an amount responsive to their position with respect to the main scanning direction X. Thereby, 24 pixel units P are outputted from among the 26 pixel units Q1 to Q26. The predetermined timing of the shift is determined as described in the first preferred embodiment and the shift operations are performed by changing the amount of shift at every two read-out clocks. FIG. 18 illustrates the result obtained by the shift operations.

Now, 24 pixel units P1 to P24 corresponding to 8 pixels D read out at a first point in time (on the top line) is outputted as a scanning line output signal S12 (FIG. 16). More specifically, the barrel shifter 49B in FIG. 16 assigns a gradient value for the pixel D1 to the pixel units P1 to P3, a gradient value for the pixel D2 to the pixel units P4 to P6. In a similar fashion, gradient values for the pixels D3 to D8 are assigned to the pixel units P7 to P24. As a result, the scanning line output signal S12 consisting of the pixel units P1 to P24 is outputted. The spatial light modulator drive circuit 25 (FIG. 2) drives the spatial light modulator 24 in accordance with the scanning line output signal S12, whereby the pixel units P1 to P24 are outputted onto the imaging plate 11. This condition is referred to as a reference condition in the shift operations.

The same as just described is also performed on 8 pixels D read out at a next point in time (on the second line from the top).

Next, gradient values for subsequent 8 pixels D (on the third line from the top) are converted by the resolution converter 48B (FIG. 16) into gradient values for 24 pixel units Q and then outputted after being shifted to the left from the reference condition by an amount corresponding to one pixel unit P. The barrel shifter 49B outputs the 23 pixel units Q2 to Q24 except the leftmost pixel unit Q1 and the pixel unit Q25 corresponding to the pixel D1 of the next scanning line, as 24 pixel units P1 to P24, respectively.

More specifically, the barrel shifter 49B in FIG. 16 assigns the gradient value for the pixel D1 to the pixel units P1 and P2, the gradient value for the pixel D2 to the pixel units P3 to P5, and the gradient value for the pixel D3 to the pixel units P6 to P8. In a similar fashion, the gradient values for a total of five pixels D4 to D8 are assigned to a total of 15 pixel units P9 to P23. Further, the gradient value for the pixel D1 of the next scanning line read out from the buffer memory BM2 is assigned to the pixel unit P24.

The same as just described is also performed on subsequent 8 pixels D (on the fourth line from the top).

Next, gradient values for subsequent 8 pixels D (on the fifth line from the top) are converted by the resolution converter 48B into gradient values of 24 pixel units Q and then outputted after being shifted to the left from the reference condition by an amount corresponding to two pixel units P. The barrel shifter 49B outputs 22 pixel units, of the 24 pixel units Q corresponding to the gradient values for 8 pixels D, except the left-side two pixel units Q1 and Q2 and two pixel units Q25 and Q26 corresponding to a first pixel D1 of the next scanning line, as a total of 24 pixel units P1 to P24, respectively.

That is, the barrel shifter 49B in FIG. 16 assigns the gradient value for the pixel D1 to the pixel unit P1, the gradient value for the pixel D2 to the pixel units P2 to P4, and the gradient value for the pixel D3 to the pixel units P5 to P7. In a similar fashion, the gradient values for a total of five pixels D4 to D8 are assigned to a total of 15 pixel units P8 to P22. Further, the gradient value for the pixel D1 of the next scanning line read out from the buffer memory BM2 is assigned to the pixel units P23 and P24.

The same as just described is also performed on subsequent 8 pixels D (on the sixth line from the top).

Further, subsequent 8 pixels D (on the seventh line from the top) are subjected to the same operation as performed on the first 8 pixels (on the first line). Hereinafter, the same operations as above described are repeated in sequence until the imaging operation for the first scanning line is completed.

The recording head 20 has an image area of the same width as the width of one scanning line in the sub-scanning direction Y; therefore, imaging is performed without overlapping of the scanning lines. In determining the gradient values for the pixel units P, not only image data in the "Write 1" area but also image data in the "Write 2" area in the buffer memory BM2, in which redundant data has previously written, are read out to make up for the shortage of the pixel D caused by shifting in the second correction operation. This enables continuous imaging.

Next, an imaging operation for a second scanning line is performed. As shown in the row of "Output No. 2" in FIG. 17B, next image data is written into a "Write 4" area across the buffer memories BM4 and BM1 and image data in the buffer memories BM2 and BM3 are read out. Then, the second correction operation is performed on the readout image data, the result of which is outputted on the imaging plate 11 by means of the recording head 20.

Further, an imaging operation for a third scanning line is performed. As shown in the row of "Output No. 3" in FIG. 17B, next image data is written into the "Write 1" area across the buffer memories BM1 and BM2 and image data in the buffer memories BM3 and BM4 are read out. Then, the second correction operation is performed on the readout image data, the result of which is outputted on the imaging plate 11 by means of the recording head 20.

Furthermore, an imaging operation for a fourth scanning line is performed. As shown in the row of "Output No. 4" in FIG. 17B, next image data is written into the "Write 2" area across the buffer memories BM2 and BM3 and image data in the buffer memories BM4 and BM1 are read out. Then, the second correction operation is performed on the readout image data, the result of which is outputted on the imaging plate 11 by means of the recording head 20.

Hereinafter a repetition of like operations achieves continuous output for the scanning lines.

In the case of the last scanning line, one half of image data is actual data relating to the last scanning line and the other half is null data. Such image data is read out from the buffer memory BM and outputted after the second correction operation.

<C. Modifications>

In the aforementioned preferred embodiments, the "blocks" are of the same size Nc (Nc=6), i.e., the number of pixels Nb can be divided by the number of pixels Na. However, the present invention is also applicable to the case where the number of pixels Nb cannot be divided by the number of pixels Na. In such a case, the number of pixels arranged in the main scanning direction X in each block should be increased or reduced as appropriate. For example where Na=8 and Nb=50, the image area should be divided into blocks having 7 pixels, 6 pixels, 6 pixels, 6 pixels, 7 pixels, 6 pixels, 6 pixels and 6 pixels, respectively, in this order in the main scanning direction X. Such block size control can be performed by the memory access controller 45A (45B).

Further, the "sub-blocks" in the above preferred embodiments are of the same size Ne (Ne=2), but the present invention is not limited thereto. For example when the size of one block corresponds to 7 pixels, the block may be divided into three sub-blocks having three pixels, two pixels, and two pixels, respectively. Such block size control can be performed by the memory access controller 45A (45B).

While the invention has been shown and described in detail, the foregoing description is in all aspects illustrative and not restrictive. It is therefore understood that numerous modifications and variations can be devised without departing from the scope of the invention.

What is claimed is:

1. An image recorder for recording an input image on an image recording medium along scanning lines inclined with respect to a main scanning direction, by using a continuous scanning system for performing a continuous scan in both said main scanning direction and a sub-scanning direction, said image recorder comprising:

a recording head for outputting each pixel in said input image as a set of pixel units smaller than said pixel, said recording head having a higher resolution than said input image in said sub-scanning direction;

a scanning section for performing a scan by continuously moving said recording head relative to said image recording medium in both said main scanning direction and said sub-scanning direction;

a memory for storing image data of said input image;

an access controller for, for access to said memory, setting an angle difference between a write angle and a read angle to be equal to an inclination angle of said scanning lines with respect to said main scanning direction, said write angle being an angle at which said image data is written into an address space in said memory, said read angle being an angle at which said image data is read out from said address space in said memory; and a shift controller for outputting image data read out from said address space in a position that is shifted in said sub-scanning direction by a shift amount responsive to said inclination angle, the smallest unit of said shift amount being said pixel unit.

2. The image recorder according to claim 1, wherein said continuous scanning system is a spiral scanning system for performing a scan while continuously moving said recording head in said sub-scanning direction orthogonal to said main scanning direction relative to an image recording medium which is located on a rotator rotating in said main scanning direction, thereby to record an image along said scanning lines inclined with respect to said main scanning direction.

3. The image recorder according to claim 2, further comprising:

a block divider for dividing said memory into blocks along said main scanning direction, on the basis of a ratio of the size of an image area of said recording head in said sub-scanning direction to that in said main scanning direction;

a sub-block divider for further dividing each of said blocks into sub-blocks on the basis of a resolution ratio between said input image and said recording head; and a shift amount setting section for setting said shift amount responsive to said inclination angle for each of said sub-blocks.

4. The image recorder according to claim 3, further comprising:

a size controller for controlling the sizes of said sub-blocks.

5. The image recorder according to claim 2, wherein an image area of said recording head is greater in width than said scanning lines in said sub-scanning direction.

6. The image recorder according to claim 5, wherein said image area of said recording head has a width that is obtained by adding the width of said scanning lines and a width smaller than the width of one pixel in said input image.

7. The image recorder according to claim 5, wherein said memory substantially has a storage area corresponding to three main scans.

8. The image recorder according to claim 2, wherein an image area of said recording head has the same width as said scanning lines in said sub-scanning direction.

9. The image recorder according to claim 8, wherein said recording head has a resolution of an integral multiple of the resolution of said input image in said sub-scanning direction.

10. The image recorder according to claim 8, wherein said memory substantially has a storage area corresponding to four main scans.

11. The image recorder according to claim 2, wherein said recording head uses a spatial light modulator for recording an image on said image recording medium.

12. The image recorder according to claim 11, wherein said spatial light modulator is a diffraction grating light valve.

13. The image recorder according to claim 2, wherein a resolution ratio between said input image and said recording head is variable.

14. An image recording method for recording an input image on an image recording medium along scanning lines inclined with respect to a main scanning direction, by using a continuous scanning system for performing a continuous scan in both said main scanning direction and a sub-scanning direction, said method comprising the steps of:

(a) setting an angle difference between a write angle and a read angle to be equal to an inclination angle of said scanning lines with respect to said main scanning direction for making access to a memory for storing image data of said input image, said write angle being an angle at which said image data is written into an address space in said memory, said read angle being an angle at which said image data is read out from said address space in said memory; and (b) performing a scan while continuously moving a recording head relative to said image recording medium in both said main scanning direction and said sub-scanning direction for outputting each pixel in said input image as a set of pixel units smaller than said pixel, said recording medium having a higher resolution than said input image in said sub-scanning direction, wherein in said step (b), image data read out from said address space in said step (a) is outputted in a position that is shifted in said sub-scanning direction by a shift amount responsive to said inclination angle, the smallest unit of said shift amount being said pixel unit.

* * * * *